United States Patent [19]
Torii

[11] Patent Number: 6,122,712
[45] Date of Patent: Sep. 19, 2000

[54] CACHE COHERENCY CONTROLLER OF CACHE MEMORY FOR MAINTAINING DATA ANTI-DEPENDENCE WHEN THREADS ARE EXECUTED IN PARALLEL

[75] Inventor: Sunao Torii, Tokyo, Japan

[73] Assignee: NEC Corporation, Tokyo, Japan

[21] Appl. No.: 08/946,061

[22] Filed: Oct. 7, 1997

[30] Foreign Application Priority Data

Oct. 11, 1996 [JP] Japan .................................. 8-289179

[51] Int. Cl.[7] .............................. G06F 12/12; G06F 12/16
[52] U.S. Cl. ......................... 711/141; 709/102; 710/200; 710/216
[58] Field of Search ................... 711/141, 145; 710/200; 709/102; 712/216

[56] References Cited

U.S. PATENT DOCUMENTS

| | | | |
|---|---|---|---|
| 5,287,508 | 2/1994 | Hejna, Jr. et al. ..................... | 709/102 |
| 5,535,361 | 7/1996 | Hirata et al. ............................. | 711/145 |
| 5,724,549 | 3/1998 | Selgas et al. ............................ | 711/141 |
| 5,740,448 | 4/1998 | Gentry et al. ............................ | 710/200 |
| 5,812,811 | 9/1998 | Dubey et al. ............................ | 712/216 |
| 5,884,067 | 3/1999 | Storm et al. ............................. | 345/511 |

*Primary Examiner*—B. James Peikari
*Attorney, Agent, or Firm*—McGuire Woods, LLP

[57] ABSTRACT

Disclosed is a cache coherency controller used in a multi-processor system. The cache coherency controller reflects a cache line including data produced by a preceding thread to a cache line including data produced by a succeeding thread. On the other hand, the cache coherency controller prevents a cache line including data produced by the succeeding thread from being reflected to the cache line including data produced by the preceding thread. The cache coherency controller maintains a sequential order (relationship) among threads based on a thread sequence information table and thereby maintains data anti-dependence.

8 Claims, 22 Drawing Sheets

CACHE COHERENCY CONTROLLER OF CACHE MEMORY FOR MAINTAINING DATA ANTI-DEPENDENCE WHEN THREADS ARE EXECUTED IN PARALLEL

BACKGROUND OF THE INVENTION

The present invention relates to a cache coherency controller of a cache memory, and more particularly to a cache coherency controller of a cache memory for maintaining data anti-dependence when a plurality of threads having sequential orders are executed in parallel.

In order to exploit parallelism in a problem, a multi-thread execution method for dividing a single sequential program into a plurality of instruction streams (referred to as "threads", hereinafter) and executing these threads in parallel has been proposed.

In this multi-thread execution method, threads are generated by a fork operation. A (parent) thread which performs a fork operation is called a "preceding thread" and a newly generated (child) thread is called a "succeeding thread". Threads are eliminated after performing a prescribed operation in a multi-thread program. In other words, the generation and the elimination of threads are repeated. Each thread is allocated to a processor. In a system physically having a plurality of processors, a plurality of threads are simultaneously executed. By allocating a plurality of threads to each processor, delaying can be concealed by starting another thread when one thread is placed in a "waiting" state (e.g., caused by a synchronizing miss, resource contention, or a cache miss) and accordingly the utilization efficiency of resources can be increased.

If a sequential program is divided into a plurality of threads which have sequential execution order, there is a possibility that a preceding thread may read an erroneous value when a succeeding thread writes a future value for the same address before the preceding thread reads data. Such a relationship is called "data anti-dependence". In order to deal with such data anti-dependence, conventionally, the reading of an erroneous value has been prevented by storing information regarding all load or store operations beforehand and performing controlling so as to prevent the stored data of a succeeding thread from being used for the loading of a preceding thread.

However, in the prior art, since it is necessary to store the write address of the succeeding thread beforehand and make a comparison between the succeeding thread and the preceding thread, exclusively used and complex hardware must be prepared.

In addition, since the numbers of addresses and data to be stored differ depending on the characteristics of executed problems, hardware is useless in a problem in which the number of times of accessing to a main memory is small. In a problem in which the number of times of accessing to the main memory is large, the number of entries for registering addresses/data becomes short and consequently parallel execution is limited.

SUMMARY OF THE INVENTION

In view of the foregoing problem of the conventional system, an object of the present invention is to eliminate a data anti-dependence by a cache memory when a plurality of threads having sequential orders are to be simultaneously executed in the same memory space.

In a cache coherency controller according to a first aspect of the present invention, a cache coherency controller reflects a cache line including data produced by a preceding thread to a cache line including data produced by a succeeding thread and prevents from reflecting a cache line including data produced by said succeeding thread to said cache line including data produced by said preceding thread.

With the unique and unobvious structure of the present invention, data anti-dependences are assured in a cache memory.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENTS

A cache coherency controller in accordance with preferred embodiments of the present invention will be described in detail with reference to the accompanying drawings.

First, the principle of the invention will be described by referring to FIG. 1.

Figure 1:
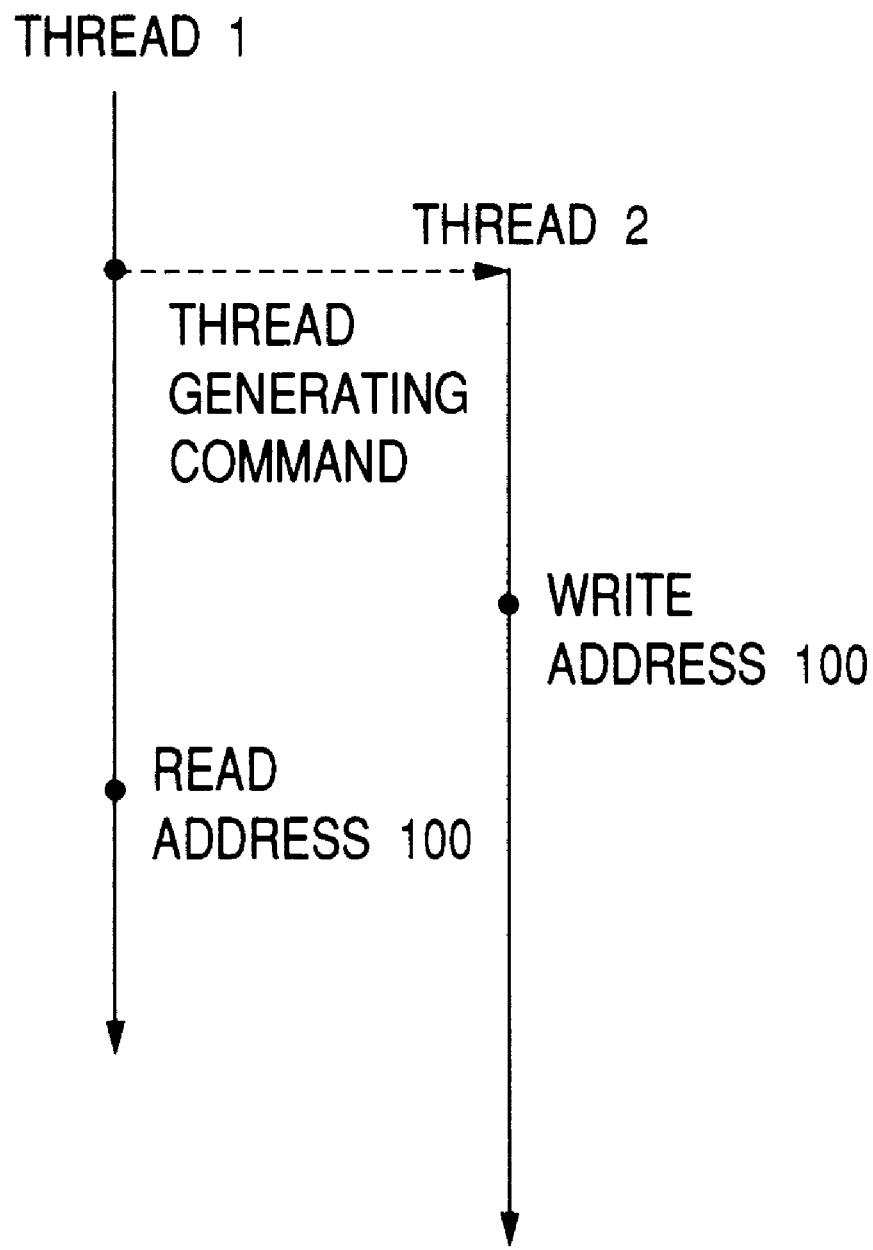
FIG. 1 is a thread execution model view illustrating a principle of the present invention.

Referring to FIG. 1, according to the invention, an operation is guaranteed by a cache memory such that a value before the execution of a writing operation by a thread 2 can be read for the reading operation of a thread 1 as a preceding thread (e.g., reading of an address 100) even when the thread 2 following the thread 1 executes a writing operation (e.g., writing in the address 100) in a preceding manner (in a physical time sequence).

Figure 2:
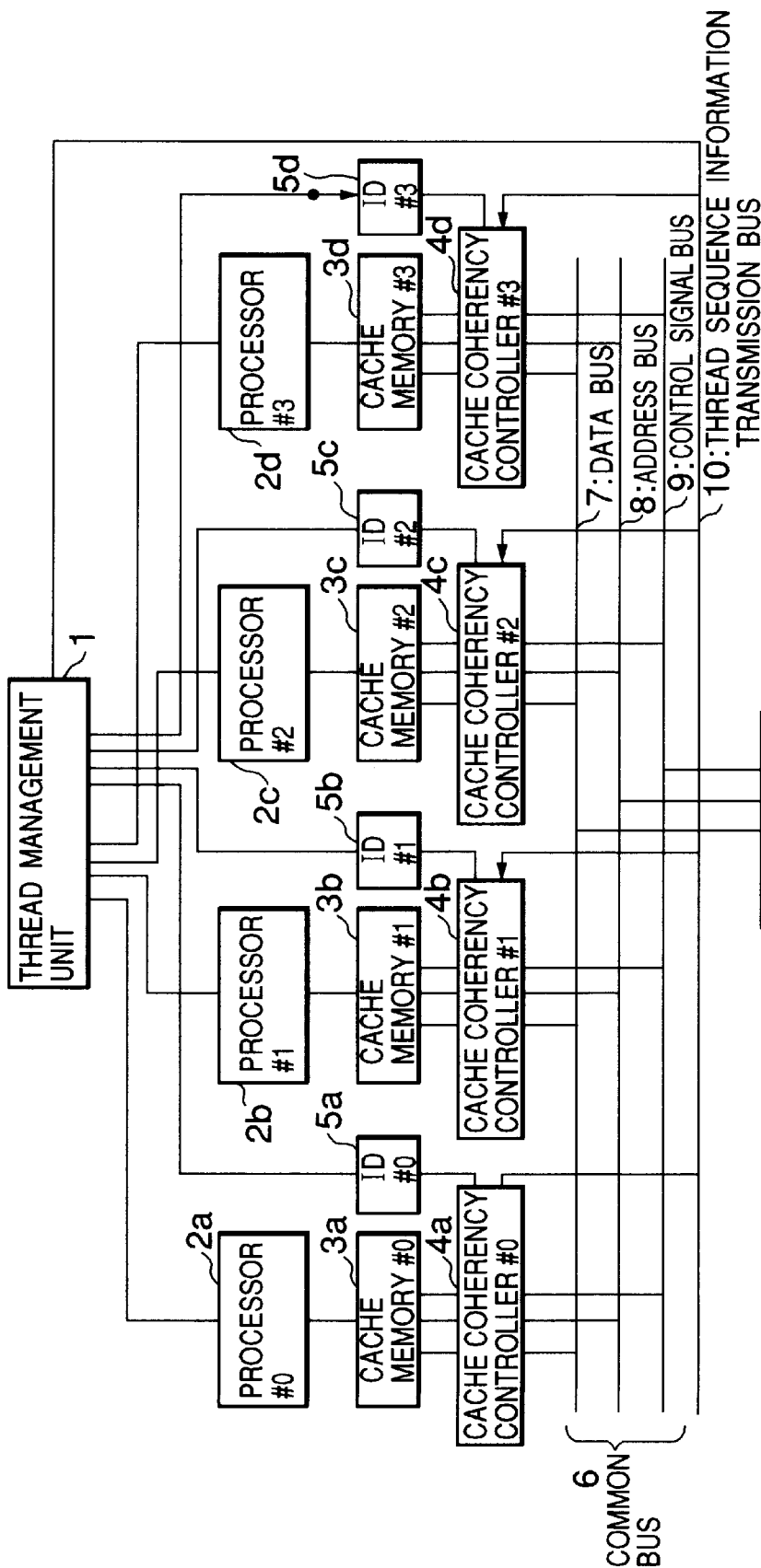
FIG. 2 is a block diagram showing the configuration of a first embodiment of the present invention.

Referring to FIG. 2, the multi-processor system of the first embodiment of the invention includes four processors #0 to #3 (2a to 2d), cache memories #0 to #3 (3a to 3d) respectively corresponding to the processors, cache coherency controllers (4a to 4d) and thread identifier registers #0 to #3 (5a to 5d). The processors 2a to 2d are connected to a thread management unit 1. The four processors are shown in FIG. 2 only for the purpose of illustrating the invention. It should thus be understood that the number of processors is not limited to four.

Each of the processors 2a to 2d is connected to any of the corresponding cache memories 3a to 3d. The cache memories 3a to 3d are respectively connected to a common bus 6 via the cache coherency controllers 4a to 4d.

The common bus 6 comprises a data bus 7, an address bus 8 and a control signal bus 9. The control signal bus 9 transmits signals indicating the meanings, and so on, of signals on the data bus 7 and the address bus 8.

The cache coherency controllers 4a to 4d are also connected to a thread sequence information transmission bus 10 and the thread identifier registers 5a to 5d provided corresponding to the controllers.

The thread management unit 1 manages the generation and the eliminating of threads. The circuit 1 allocates thread identifiers (ID) to threads in order of generation and notifies the thread identifier register 5 of these thread identifiers. The processor, the thread identifier register and the cache coherency controller will be denoted by numerical references 2, 3 and 4 respectively, hereinafter, unless specified otherwise.

The thread identifier register 5 holds the thread identifiers notified by the thread management unit 1 until the end of the threads.

The thread sequence information transmission bus 10 transmits information (thread sequence information) regarding a thread sequence from the thread management unit 1 to the cache coherency controllers 4a to 4d.

This thread sequence information reflects a value held by the thread identifier register 5. A main memory 11 is shared by the processors 2a to 2d and these elements are connected together via the bus 6.

The cache coherency controller 4 performs controlling so as to maintain coherency among the cache memories 3 based on a request from the corresponding processor 2 and a signal transmitted through the common bus 6.

Figure 3:
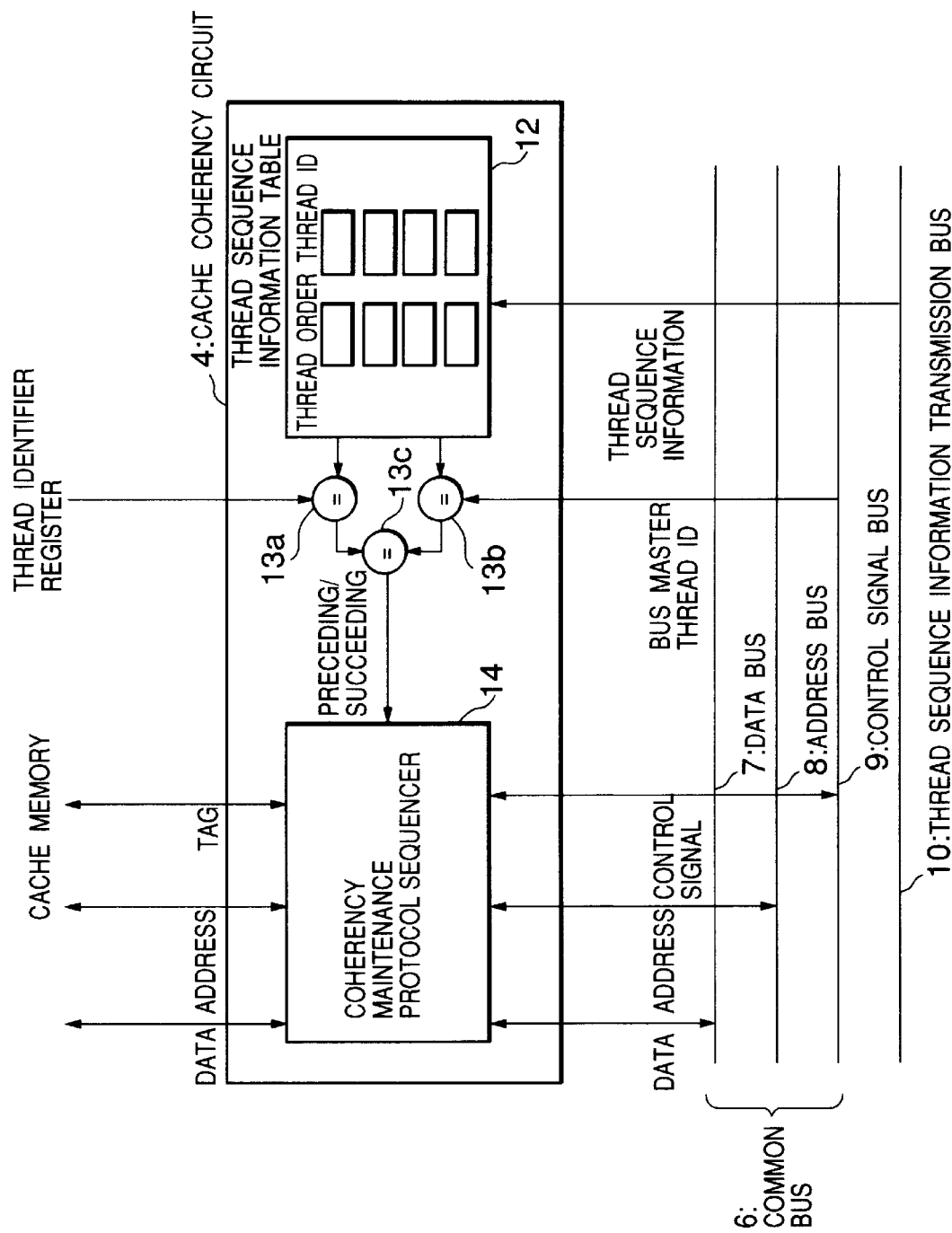
FIG. 3 is a block diagram showing in detail the configuration of a cache coherency controller of the first embodiment of the invention.

Referring to FIG. 3, the cache coherency controller 4 comprises thread sequence information table 12, comparators 13a, 13b and 13c and a cache coherency maintenance protocol sequencer 14. The cache coherency controllers 4a to 4d have structures identical to one another.

The thread sequence information table 12 receives thread sequence information (i.e., sequence of thread identifiers) allocated from the thread management unit 1 via the thread sequence information transmission bus 10 and stores the information.

The comparator 13a refers to the index of the thread sequence information stored in the thread sequence information table 12 so as to search information coincident with the thread identifier held by the thread identifier register 5 and outputs its sequence location if coincidental information exists. The comparator 13b refers to the index of thread sequence information stored in the thread sequence information table 12 so as to search information coincident with a bus master thread identifier on the control signal bus 9 and outputs its sequence location if coincidental information exists. The comparator 13c compares the output of the comparator 13a with that of the comparator 13b and transmits information regarding a preceding thread to the cache coherency maintenance protocol sequencer 14. The cache coherency maintenance protocol sequencer 14 controls protocol between a local cache memory and another cache memory or the main memory based on the information transmitted from the comparator 13c.

Figure 4:
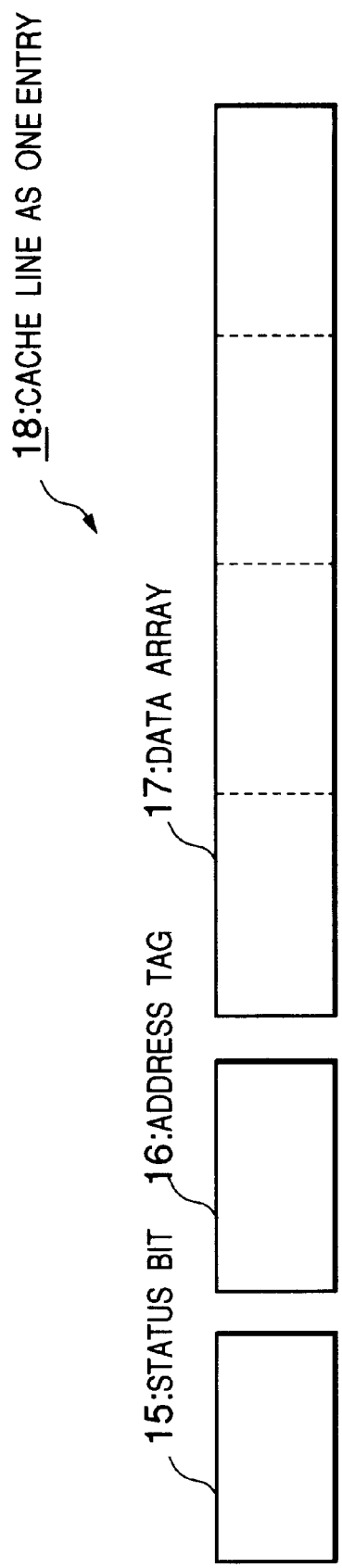
FIG. 4 is a block diagram showing a line configuration of a cache memory of the first embodiment of the invention.

Referring to FIG. 4, a cache line 18 as one entry in the cache memory 3 comprises a status bit 15, an address tag 16 and a data array 17. The cache memory 3 is composed of a plurality of cache lines 18.

The status bit 15 holds the status of the cache line and selects any status of the following four, i.e., "I" (Invalid), "C" (clean), "D" (Dirty) and "DSM" (Dirty Self-Modified). The status "I" means that the content of the cache line is invalid. The status "C" means that the content of the cache line coincides with that stored in the main memory. The status "D" means that the content of the cache line does not coincide with that stored in the main memory because of modification. The status "DSM" means that the content of the cache line does not coincide with that stored in the main memory and the cache line has been modified by its local processor. Based on such cache status, the cache coherency controller 4 maintains coherency while keeping a sequential order among a plurality of caches.

Next, the operation of the cache memory 3 of the first embodiment will be described.

Figure 5:
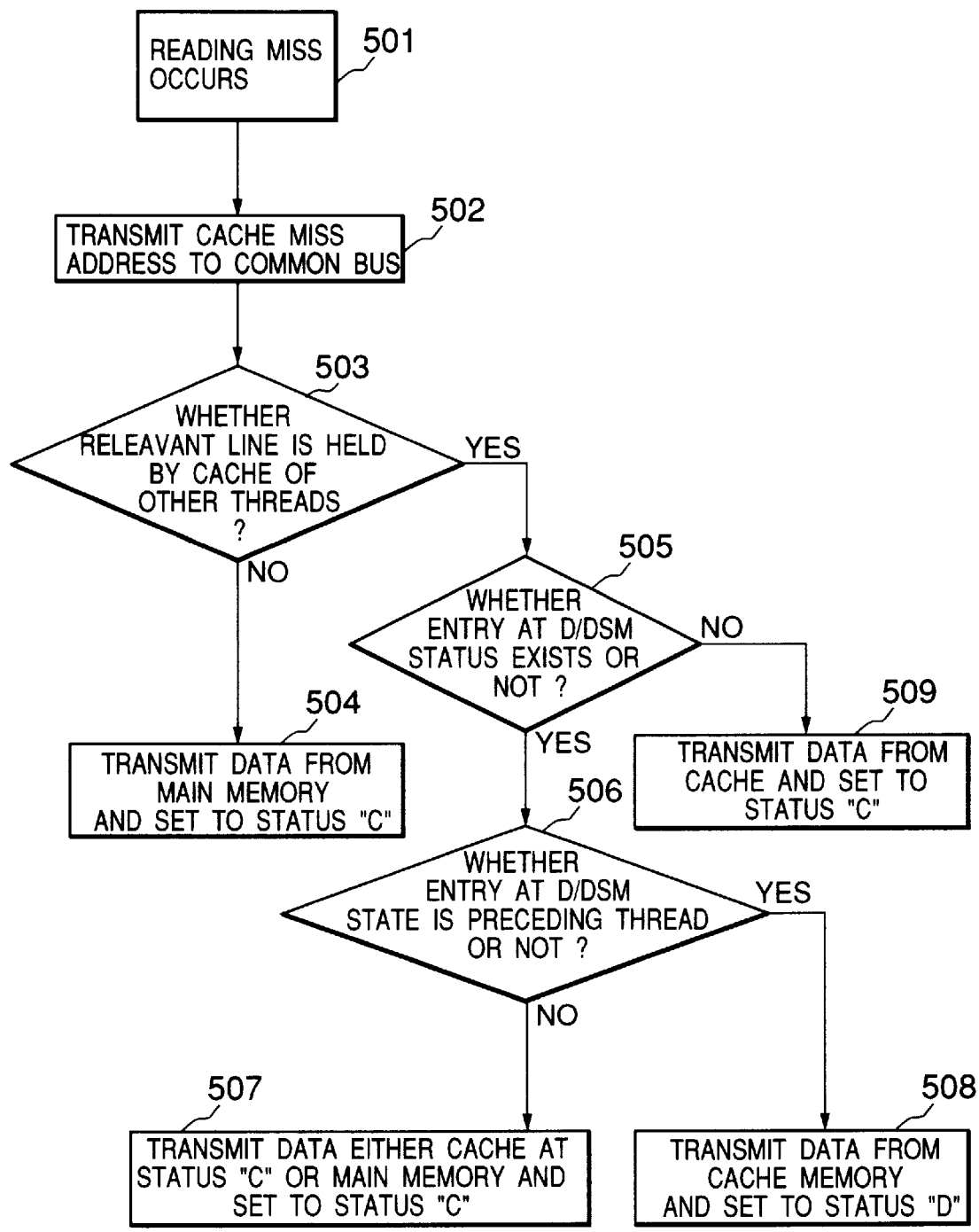
FIG. 5 is a flowchart illustrating a processing flow when a reading miss occurs in the cache coherency controller of the first embodiment of the invention.
Figure 6:
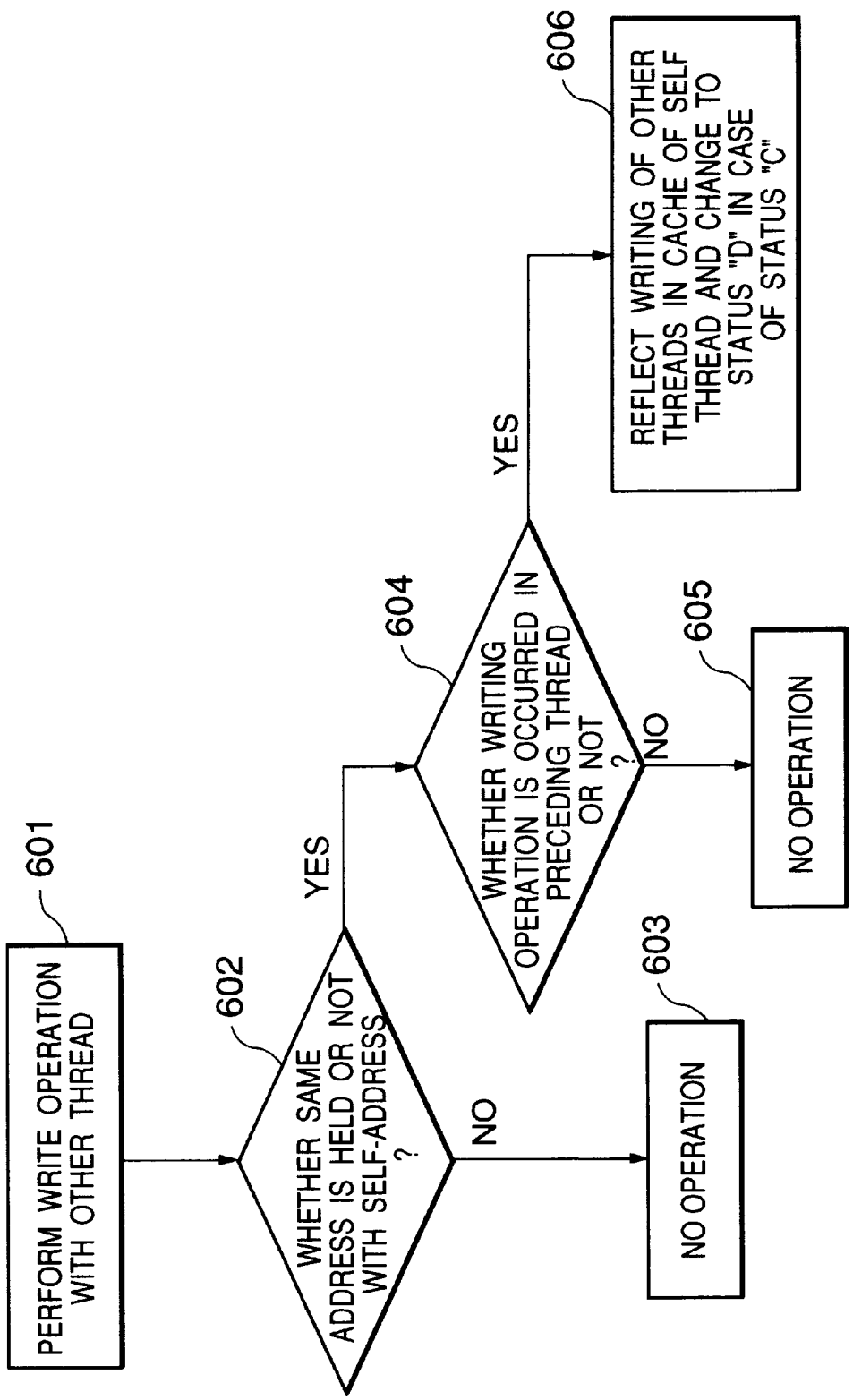
FIG. 6 is a flowchart illustrating a processing flow during a writing operation performed by the cache coherency controller of the first embodiment of the invention.

FIGS. 5 and 6 are flowcharts each showing algorithm for maintaining cache coherency by the cache coherency maintenance protocol sequencer 14 in the cache coherency controller 4 of the embodiment. Specifically, FIG. 5 shows operation algorithm used when a reading cache miss-hit occurs and FIG. 6 shows operation algorithm used when another processor starts a writing operation. When a read hit occurs, the corresponding cache memory 3 supplies data. When a write miss occurs, a read miss operation and a write hit operation are continued.

Referring first to FIG. 5, when read access is to be made by the processor 2a, if data for the access does not exist in the cache memory 3 (miss-hit) (step 501), the cache coherency controller 4a secures the right of using the common bus 6.

Then, the cache coherency controller 4a searches whether the entry of a relevant address is held or not in any of the cache lines 18 of the cache memories 3*b*, 3*c* and 3*d* which belong to the other processors 2*b*, 2*c* and 2*d*. For this purpose, the cache coherency controller 4*a* outputs a required address to the address bus 8 and then outputs information indicating that the variety of accessing is "a data request because of a read miss" and a thread identifier to the control signal bus 9 (step 502).

The other cache coherency controllers 4*b*, 4*c* and 4*d* which have not obtained the right of using the common bus 6 obtain the variety of accesses (read or write) and an address by monitoring the common bus 6. Each of the cache coherency controllers 4*b*, 4*c* and 4*d* refers to the index of information so as to determine whether an address identical to the address obtained by monitoring exists or not in the cache line 18 of each of the corresponding cache memories 3*b*, 3*c* and 3*d*.

If the result of determination by referring to the index shows that the line of the identical address exists in the plurality of cache memories ("No" in step 505), the cache coherency controller 4*a* outputs data held in any of the cache memories to the data bus if the line is only in status "C".

If the result of determination shows that the line of status "D" or status "DSM" exists ("Yes" in step 505), the cache coherency controller 4*a* outputs corresponding data to the data bus 7 (step 508) if the thread identifier of the status "D" or the status "DSM" precedes a requested thread identifier ("Yes" in step 506). In this case, if a plurality of lines exist, arbitration is performed for the common bus 6 so as to supply data from the cache coherency controller 4 corresponding to the processor for executing a preceding thread which is closest in order to the requested thread identifier. If the thread identifier of the line of the status "D" or the status "DSM" succeeds the requested thread identifier ("No" in step 506), the cache coherency controller 4*a* outputs data from the line of the status "C" or the main memory (step 507).

If the result of determination made by referring to the index shows that no identical address lines exit in the cache line 18 corresponding to any of the cache coherency controllers 4*b*, 4*c* and 4*d*, data is outputted from the main memory 11 to the data bus 7 based on a request from the cache coherency controller 4*a* (step 504).

The cache coherency controller 4*a* which has requested data fetches desired data in the cache line 18 by receiving the broadcast data.

At this time, if the data is supplied from any of the cache memories 3*b*, 3*c* and 3*d* and its line is in status "D" or status "DSM", the status bit 15 of the cache memory 3*a* which has made the request is set to status "D" (step 508) or to status "C" in other cases (step 509).

In the cache memory of the conventional multi-processor system, a destination for supplying data is another optional cache or the main memory when a read miss occurs. However, according to the first embodiment, a sequential order is maintained among threads by imposing restrictions on a data supplying method based on the sequential relationship by thread identifiers so as to prevent data written by a succeeding thread from being supplied to a preceding thread.

Referring now to FIG. 6, when writing is to be performed from the processor 2*a* in the cache memory 3*a* (step 601), the cache coherency controller 4*a* secures the right of accessing to the common bus 6. The controller 4*a* outputs a write address to the address bus 8, and outputs information indicating "writing" and a thread identifier to the control signal bus 9. At the same time, the controller 4*a* outputs write data to the data bus 7.

After a signal for writing has been outputted to the common bus 6, the cache coherency controllers 4*b*, 4*c* and 4*d* which do not have the right of accessing refer to the respective indexes of information in the cache memories. If the cache line 18 holds the data of address identical to the address outputted to the address bus 8 ("Yes" in step 602) and the thread identifier of the processor 2 to which the cache memory 3 belongs succeeds a thread identifier on the control signal bus 9 ("Yes" in step 604), since the operation is writing performed by a preceding thread, the cache coherency controller 4 reflects the content of the writing in the cache line 18. Further, if the status bit 15 of the cache line 18 is status "C", the status is changed to status "D" (step 606).

The status bit 15 of the cache line 18 of the cache memory 3 corresponding to the processor 2*a* which has performed the writing operation is set to status "DSM" by the cache coherency controller 4*a*.

In this way, the writing of the preceding thread is automatically reflected in the cache memory 3 of the succeeding thread. However, since the writing of the succeeding thread is not reflected in the cache memory 3 of the preceding thread (step 605), a time sequence relationship between the threads is maintained.

If a preceding thread exists, the cache line 18 of a succeeding thread which is in status "DSM" is prohibited from writing-back to the main memory 11. This situation occurs because if an identical address is requested by the preceding thread, a value before writing performed by the succeeding thread is supplied from the main memory 11. If it is necessary to write back the cache line 18 which is not coincident with the main memory of the succeeding thread in order to store the data of another address in the cache memory 3, the execution of the succeeding thread is interrupted and after the end of the execution of the preceding thread, the cache line is written back. After the end of the execution of the preceding thread, the content of the data array 17 of the cache line 18 which is in status "DSM" is written back to the main memory 11.

On the other hand, for the cache line 18 of status "D", since the cache line 18 of the identical address which is in status "DSM" exists in the cache memory of another processor 2, it is unnecessary to write back. If the execution of all the preceding threads is finished while the status "D" is maintained, the status is changed to status "C".

According to the first embodiment, by performing the above-described cache controlling, the sequential order can be maintained among the threads, and data anti-dependence can be secured by the cache memory. However, if writing is started by the preceding thread for an address identical to the address already written or read by the succeeding thread thereafter, the sequential order between the threads cannot be maintained as it is. In this case, synchronism must be acquired between the threads by using software.

Next, the multi-processor system of the second embodiment of the present invention will be described.

Figure 7:
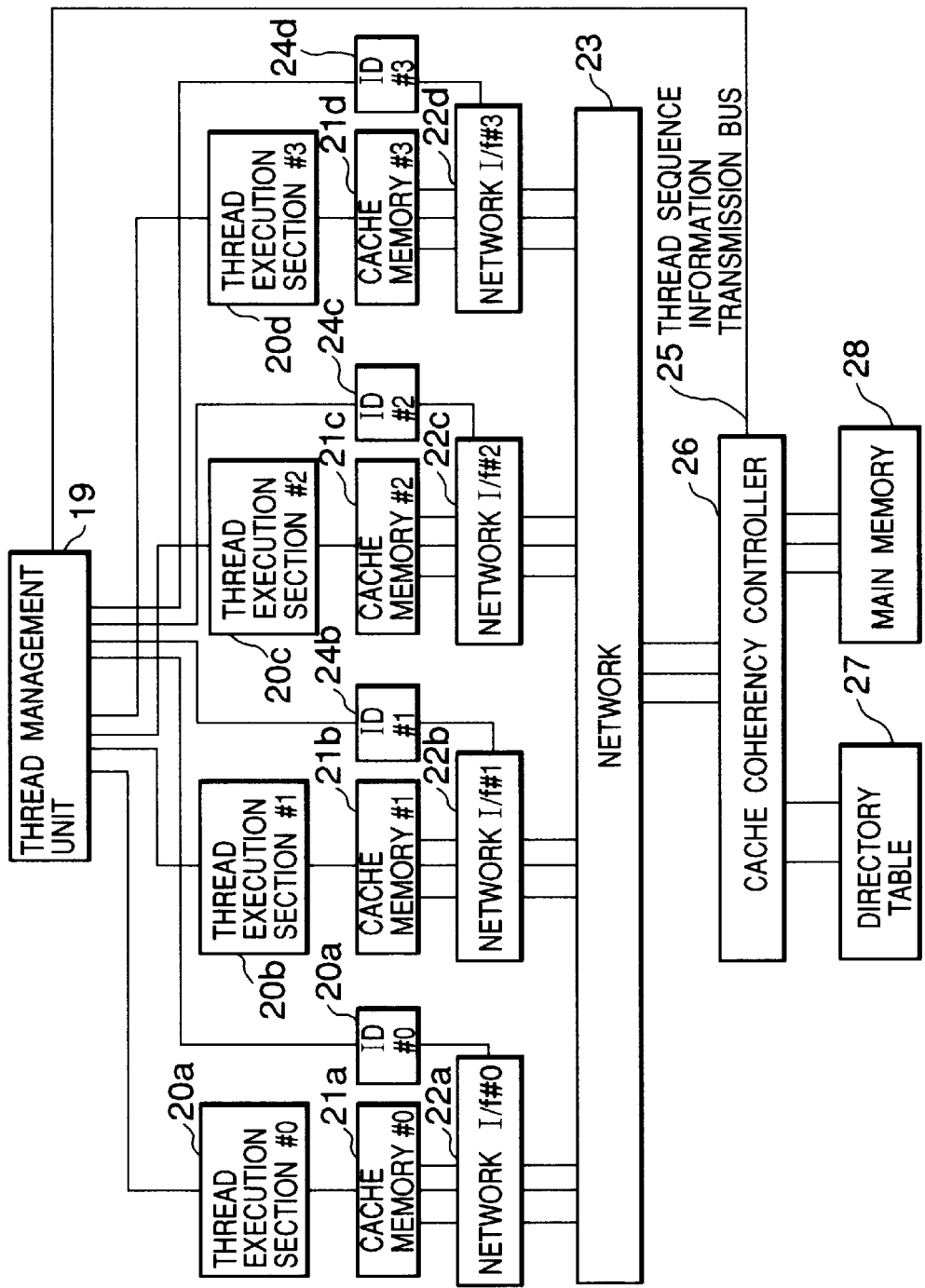
FIG. 7 is a block diagram showing the configuration of a second embodiment of the present invention.

Referring first to FIG. 7, instead of the common bus 6 of the first embodiment described above with reference to FIG. 2, the multi-processor system of the second embodiment uses a network 23 for connecting a cache memory 21 and a main memory 28 each other. Accordingly, in the second embodiment, a network interface 22 is newly added. A cache coherency controller 26 is shared by processors. The cache coherency controller 26 is directly connected to a main memory 28. A directory table 27 is connected to the cache coherency controller 26.

Figure 8:
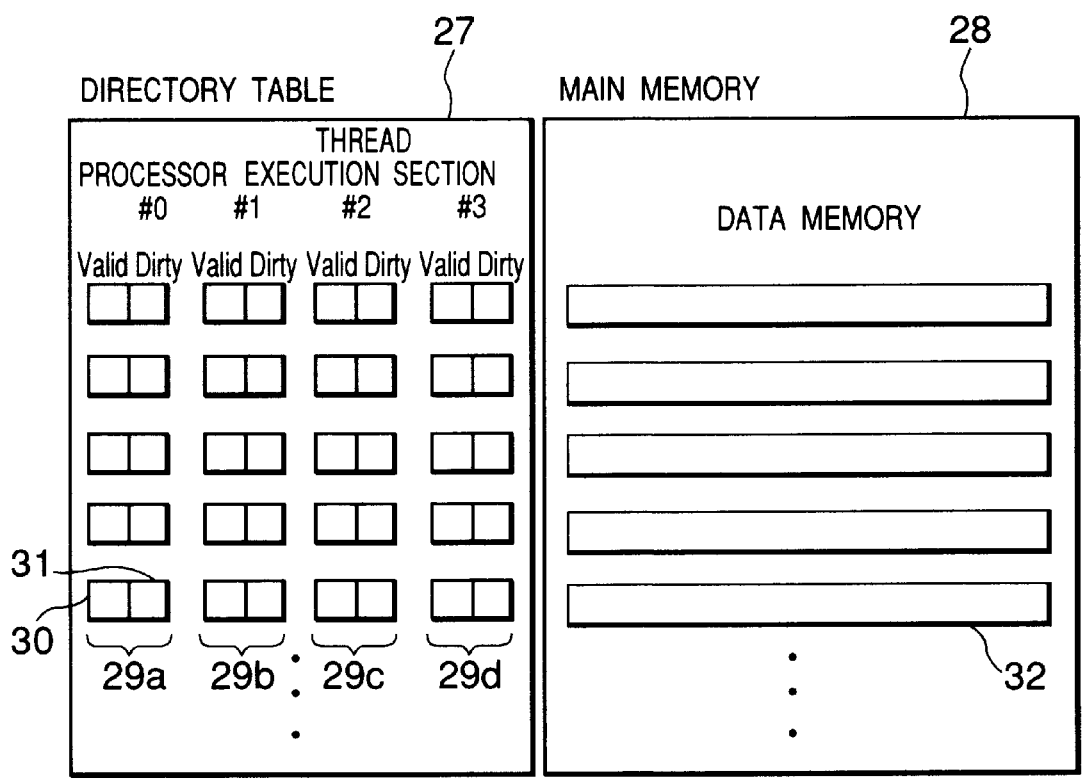
FIG. 8 is a block diagram showing a directory table/main memory of the second embodiment of the invention.

FIG. 8 is a block diagram showing the main memory 28 and the directory table 27 of the second embodiment. The directory table holds a status bit 29 corresponding to each processor 20. The status bit 29 corresponds to the memory line 32 of the main memory 28.

Referring to FIG. 8, the status bit 29 of the directory table 27 includes a valid bit indicating the existence of a copy in a cache memory 21 accompanying the processor 20, and a dirty bit 31 indicating that the processor 20 has modified the copy.

The set condition of the dirty bit 31 is called status "D". Thread sequence information is transmitted from a thread management unit 19 to the cache coherency controller 26 via a thread information transmission bus 25 for each change of the execution status of a thread.

Figure 9:
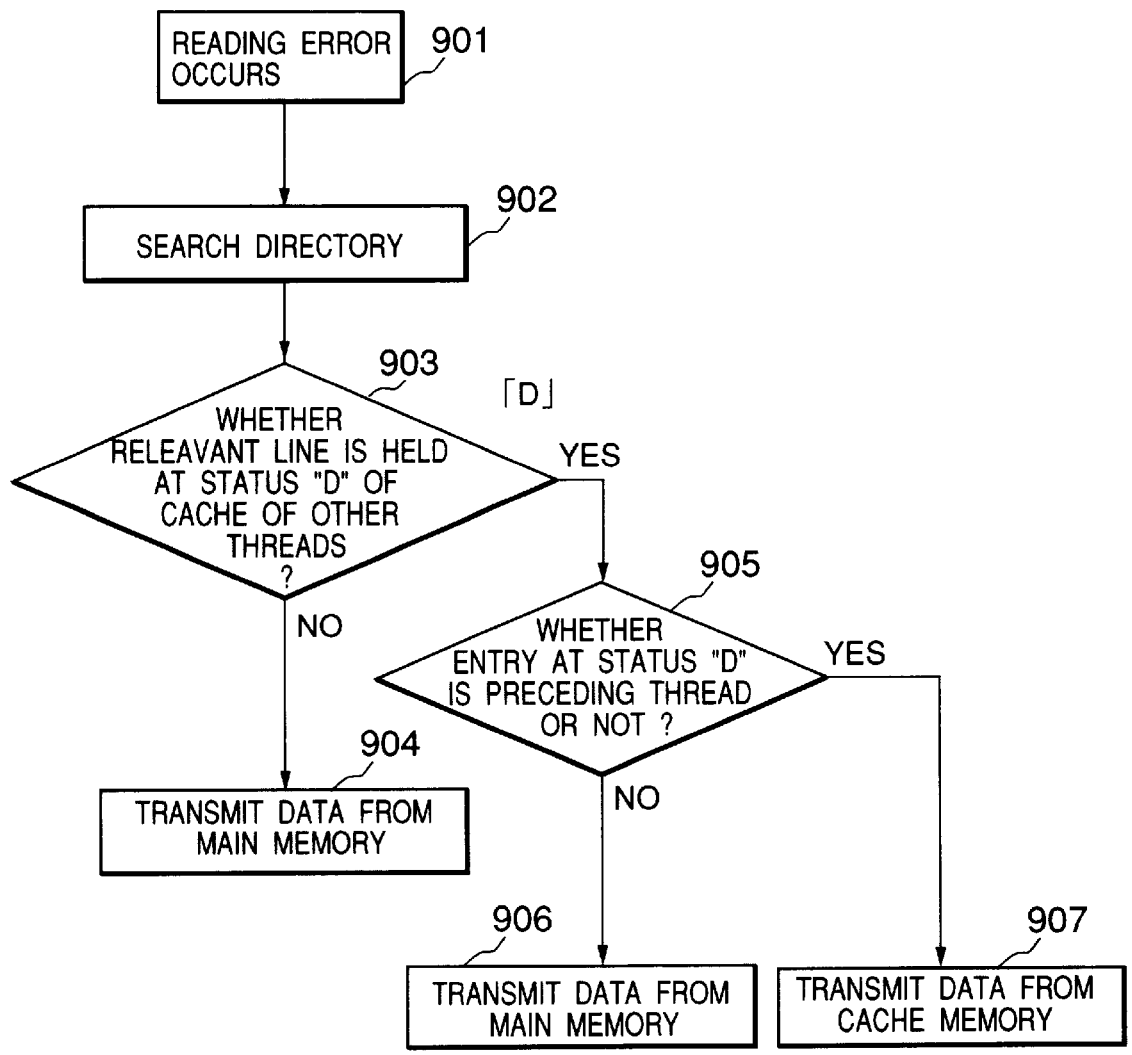
FIG. 9 is a flowchart illustrating a processing flow when a reading miss occurs in a cache coherency controller of the second embodiment of the invention.
Figure 10:
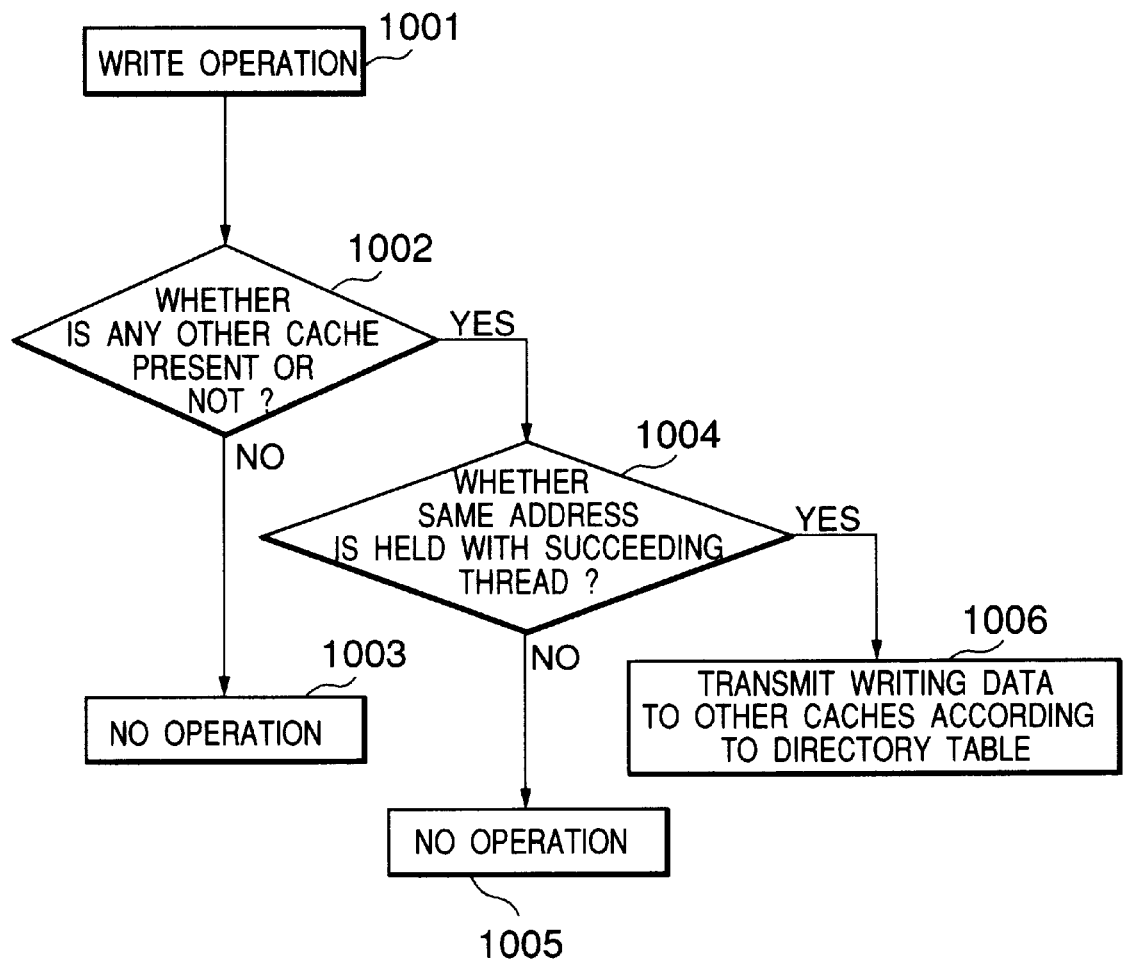
FIG. 10 is a flowchart illustrating a processing flow during a writing operation performed by the cache coherency controller of the second embodiment of the invention.

For an access request made by each processor to the main memory 28, the cache coherency controller 26 maintains coherency between caches by algorithm shown in FIG. 9 or FIG. 10.

It is now assumed that a processor 20a has started an operation for the memory. First, an operation for reading will be described.

If the data of an address requested by the processor 20a does not exist (cache miss-hit) (step 901), the cache memory 21 issues a data reading request to the cache coherency controller 26 via the network 23.

The cache coherency controller 26 searches the directory table 27 (step 902). If the controller 26 finds the entry of status "D" ("Yes" in step 903) and the entry of the status "D" is for a preceding thread ("Yes" in step 905), data transfer is requested to the cache memory 21 having the entry of the status "D". After having received the request, the cache memory 21 transfers requested line data to the cache memory 21a of the processor 20 which has issued the request (step 907).

In cases other than the above, desired data is transferred to the cache memory 21a of the processor 20a which has issued the request (steps 904 and 906).

In any cases, the valid bit 30 of the status bit 29a of the directory table 27 corresponding to the processor 20a is set.

Next, an operation for writing will be described. For writing, irrespective of a cache hit or a cache miss-hit, a data writing request is issued to the cache coherency controller 26 via the network 23.

When a cache hit occurs, an operation described below will be performed thereafter. When a cache miss occurs, an operation described below will be performed after a read operation performed at the time of the occurrence of the cache miss.

The cache coherency controller 26 searches the directory table 27 and transmits write data to the entry of a succeeding thread among the entries in which the valid bit 30 is set (step 1006). The controller 26 also sets the dirty bit 31 of the directory table 27 corresponding to the processor 20 which has made the request.

According to the second embodiment, as in the case of the first embodiment, if a preceding thread exists, for the entry of the cache memory 21 of a succeeding thread which is in status "D", the write-back to the main memory 28 is prohibited. By controlling the reflection of each of writing results for threads other than a first preceding thread in the main memory 28 and maintaining the reading request correctness of the first preceding thread, the writing of the preceding thread is automatically reflected in the cache memory 21 of the succeeding thread. However, since the writing of the succeeding thread is not reflected in the cache memory 21 of the preceding thread, a time sequence relationship is maintained among the threads.

Next, the multi-processor system of the third embodiment of the present invention will be described.

Figure 11:
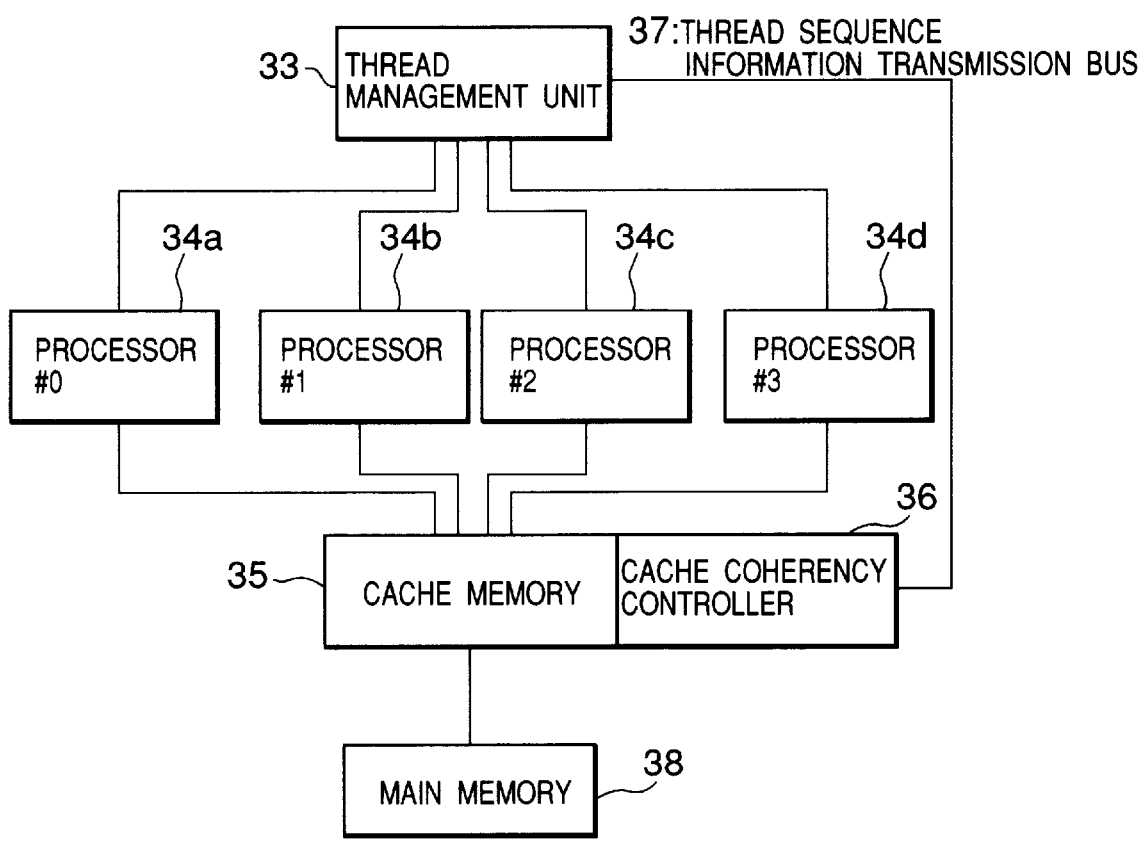
FIG. 11 is a block diagram showing the configuration of a third embodiment of the present invention.

Referring to FIG. 11 which illustrates the third embodiment, a cache memory 35 is shared by processors #0 to #3 (34a to 34d). In the third embodiment, the cache memory 35 is constructed in such a manner that data relating to a particular address can be stored in a plurality of cache lines 43 (multi-way cache structure).

Figure 12:
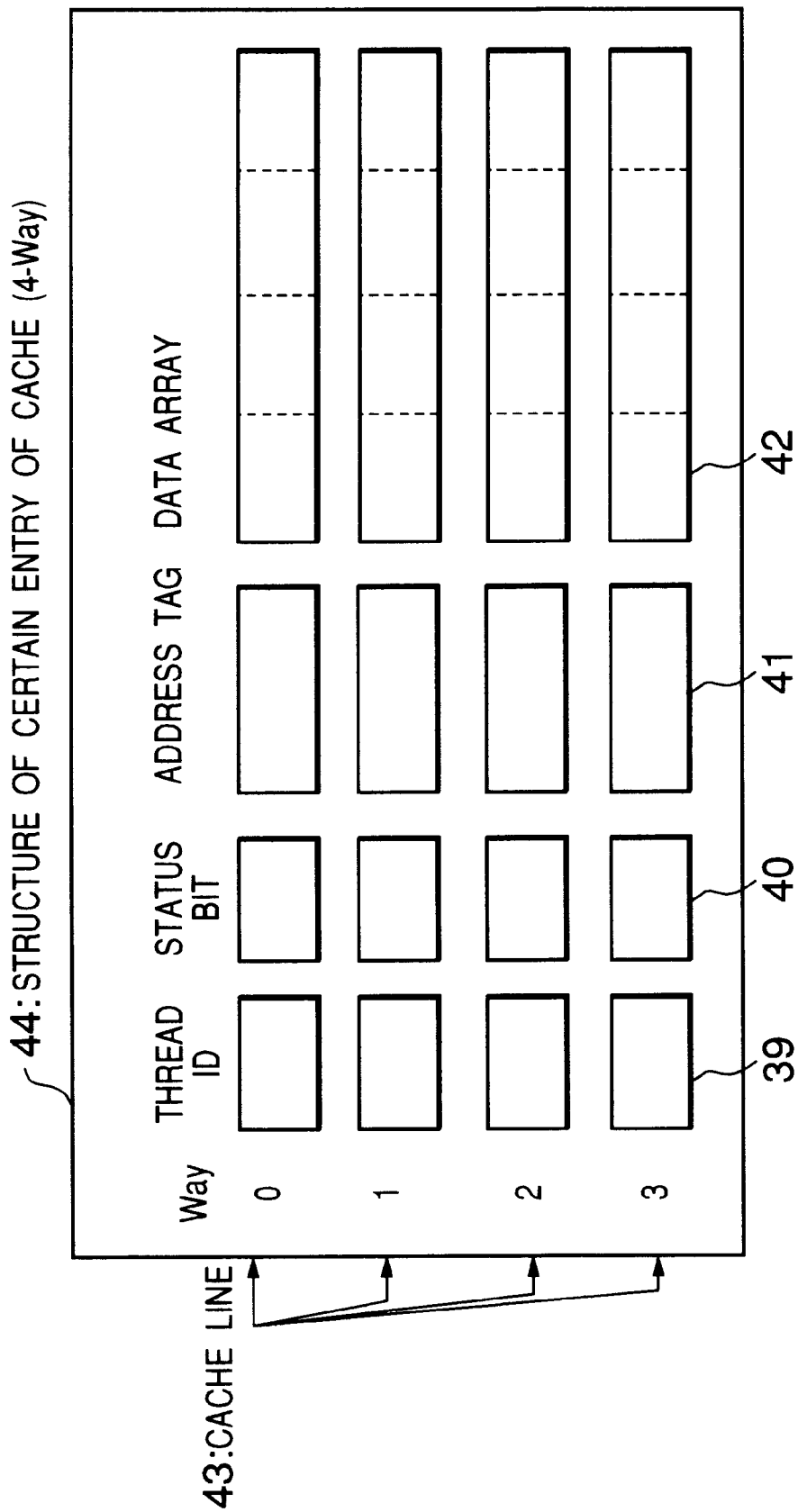
FIG. 12 is a block diagram showing the configuration of a cache entry of the third embodiment of the invention.

Referring to FIG. 12 which also illustrates the third embodiment, one entry of the cache memory holds a thread identifier tag 39 in each line. The status bit of the cache takes any one of the following three, i.e., "I" (Invalid), "C" (Clean) and "D" (Dirty). The status "I" means that the content of the cache line is invalid. The status "C" means that the content of the cache line coincides with that of the main memory. The status "D" means that the content of the cache line does not coincide with that of the main memory.

Figure 13:
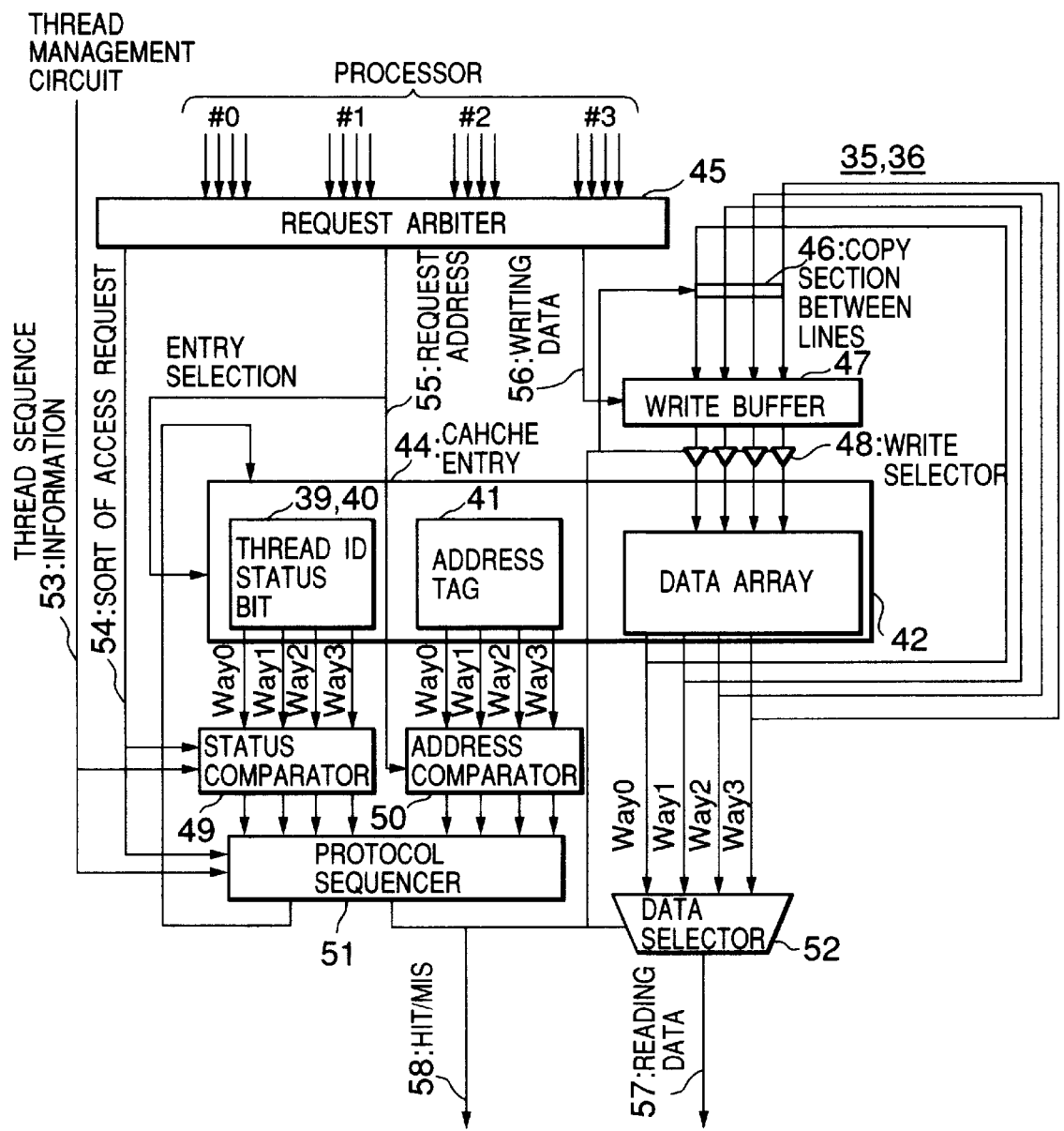
FIG. 13 is a block diagram showing in detail the configuration of a cache of the third embodiment of the invention.

Referring to FIG. 13 which illustrates a cache coherency controller of the third embodiment, in the cache coherency controller shown and denoted by a numerical reference 36, in order to share the cache memory 35, a request arbiter 45 arbitrates requests from the processors #0 to #3 (34a to 34d).

A status comparator 49, an address comparator 50 and a protocol sequencer 51 determine a cache hit/miss. For reading, data supplied from each line 43 of the cache is selected. For writing, a line 43 in which writing is to be performed is decided.

A write buffer 47 is provided for performing writing in a part of a data array 42. The write buffer 47 reads the value of the data array 42 beforehand, corrects a necessary portion and writes the corrected data in the data array 42 again.

Next, the operation of the cache memory of the third embodiment will be described.

In the third embodiment, the status of the cache hit takes the following three. i.e., self ID hit, preceding ID hit and succeeding ID hit. The status self ID hit means that a cache line coincident with a requested ID exists. The status preceding ID hit means that the cache line of a thread ID preceding the requested ID exists. The status of succeeding ID hit means that the cache line of a thread succeeding the requested ID exists.

After an access request is made from the processor 34 to the cache 35, a cache entry 44 is selected based on a part of a given request address signal 55.

From the selected cache entry, all the cache lines 43 (i.e., from way 0 to way 3) are outputted from the thread identifier tag 39, the status bit 40, the address tag 41 and the data array 42.

The address comparator 50 compares each address outputted from the address tag 41 with the request address signal 55 and sends out information regarding coincidence/non-coincidence for each cache line 43 to the protocol sequencer 51.

The status comparator 49 sends out information used for determining which status the thread identifier tag of the cache line 43 takes, self ID, preceding ID or succeeding ID, from the thread identifier of the processor 34 which has issued the request and a thread sequence information signal 53 to the protocol sequencer 51.

Figure 14:
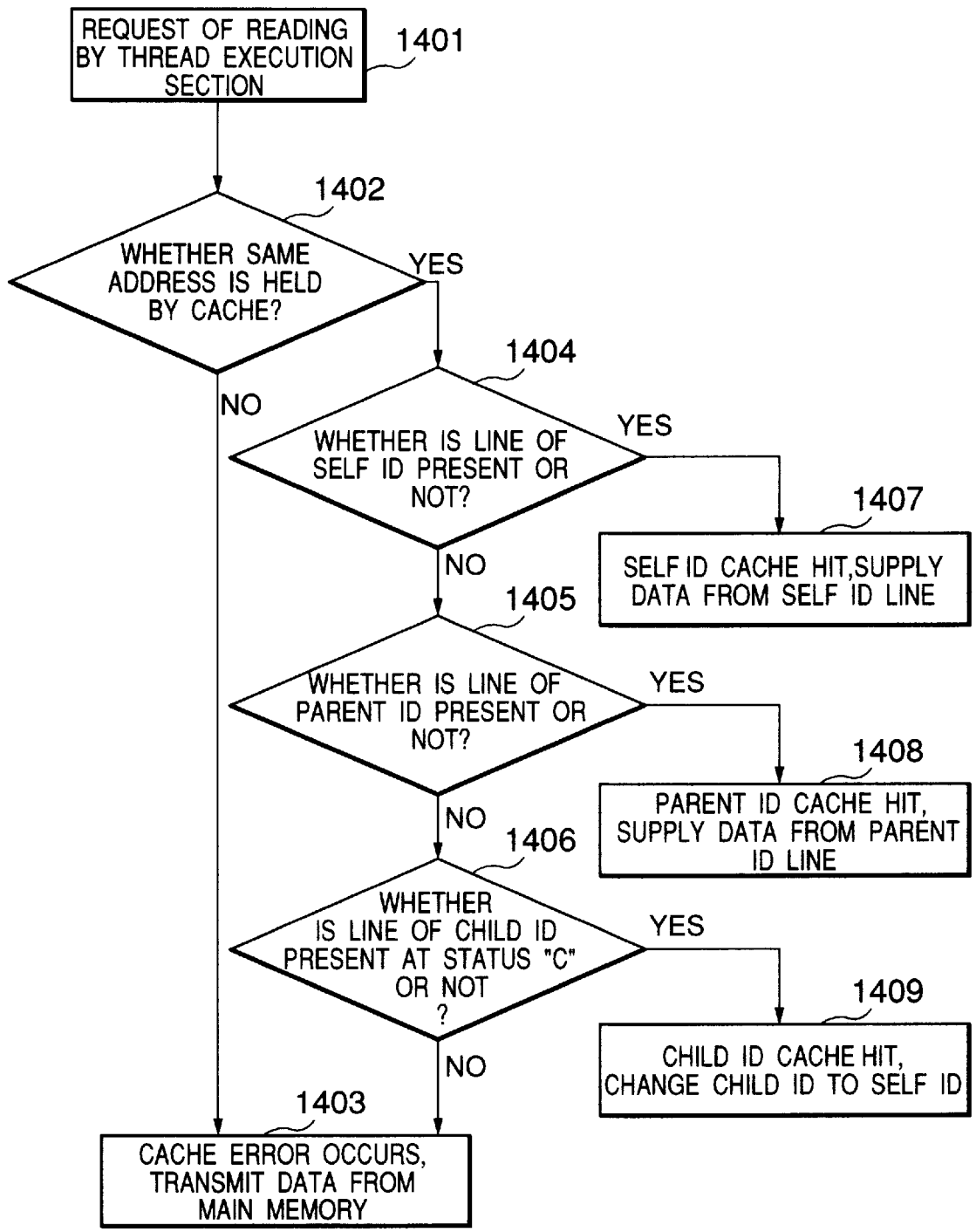
FIG. 14 is a flowchart illustrating a processing flow during a reading operation performed by a protocol sequencer of the third embodiment of the invention.
Figure 15:
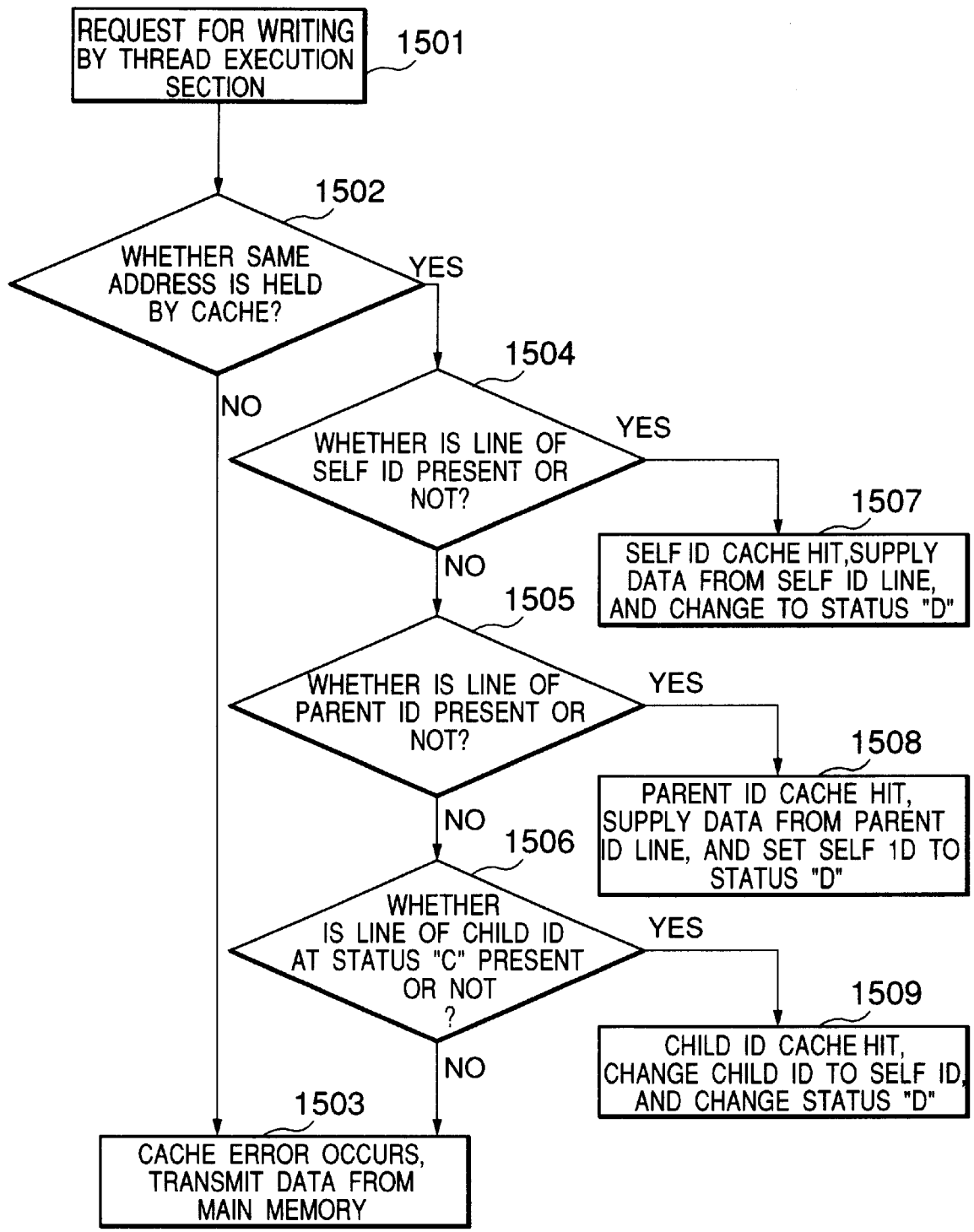
FIG. 15 is a flowchart illustrating a processing flow during a writing operation performed by the protocol sequencer of the third embodiment of the invention.

Based on such information, the protocol sequencer 51 supplies data, stores data, and maintains coherency by algorithm shown in FIGS. 14 and 15.

An operation performed when the processor 34 makes a reading request (step 1401) and the request is arbitrated and selected by the request arbiter 45 will be described.

The address comparator 50 searches whether a requested address exists in the cache line 43 or not (step 1402). If the requested address does not exist, the operation is (unconditionally) determined to be a cache miss and data is fetched from the main memory (step 1403).

If the cache line 43 coincident with the requested address exists (YES in step 1402), the status comparator 49 compares the thread identifier tag 39 with the executed thread identifier of the processor 34 which has made the request (step 1404). If IDs are identical to each other (i.e., self ID hit), the data of the data array 42 is supplied from the cache line 43 (self ID line) (step 1407).

If IDs are not identical to each other ("No" in step 1404), the status comparator 49 searches the existence of one coincident with a preceding ID (step 1405). If the cache line 43 exists for the preceding ID, the data of the data array 42 of the cache line 43 is supplied (step 1408). If a plurality of cache lines 43 coincident with the preceding ID exist, priority is given to the data of the cache line 43 holding ID closest to the self ID.

If the cache line does not hit the preceding ID, the status comparator 49 searches the existence of one coincident with the succeeding ID (step 1406). If a line coincident with the succeeding ID exists and its status is status "C", the data of the data line 42 of this cache line 43 is supplied and the succeeding ID is changed to self ID (step 1409).

If no cache lines 43 coincident with the succeeding ID exist, data is fetched from the main memory 38 (step 1402).

Figure 16:
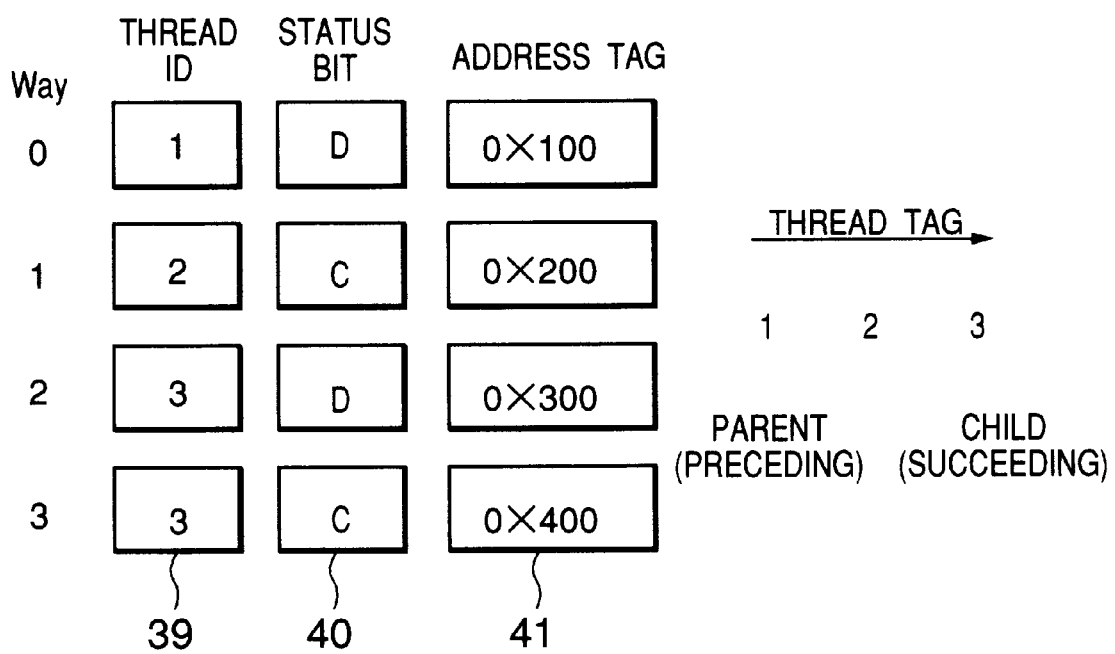
FIG. 16 is a view showing a status example of a cache entry of the third embodiment of the invention.

For example, in a state where a certain cache entry 44 is in a state like that shown in FIG. 16, when the address tag 41 of the cache memory 35 requests data regarding addresses "0×100", "0×200", "0×300" and "0×400" in the processor 34 in which a thread identifier is "2", the data of the address "0×100" is a preceding ID hit. Then, the data is supplied from the data array 42 of a preceding thread identifier, i.e., the way 0 of a thread identifier The data of the address "0×200" is self ID hit (thread identifier tag 39 of the cache entry is "2"). The data is supplied from the data array 42 of a way 1.

The data of the address "0×300" exists in a way 2. However, since the way 2 is for the thread identifier tag of "3", a succeeding thread and status "D", the data is fetched from the memory.

The data of the address "0×400" exists in a way 3. Since the way 3 is for the thread identifier 39 of "3", a succeeding thread and status "C", succeeding ID hit is realized. Accordingly, the data is supplied from the data array 42 of the way 3. Then, the thread identifier tag 39 of the way 3 is changed to "2".

Next, by referring to FIG. 15, an operation when a write request is made by the processor 34 (1501) and the request is arbitrated and selected by the request arbiter 45 will be described.

The address comparator 50 searches the existence of a requested address in the cache line 43 (step 1502). If the requested address does not exist, the operation unconditionally becomes a cache miss. After data is fetched from the memory, write data is merged by the write buffer 47 and written in the cache line 43 (step 1503).

If a cache line 43 coincident with the requested address exists ("Yes" in step 1502), the status comparator 49 compares the thread identifier tag 39 with the executed thread identifier of the processor 34 which has made the request (step 1504). If IDs are identical to each other (i.e., self ID hit), data is written in the data array 42 of the cache line 43 (step 1507). If a succeeding thread exists and its status is status "D", similar data is written in its cache line. These operations are performed by the write buffer 47.

On the other hand, if no identical ID exists ("No" in step 1504), the status comparator 40 searches the existence of one coincident with the preceding ID. If the cache line 43 of the preceding ID exists ("Yes" in step 1505), a copy section 46 between lines copies the cache line of the preceding ID as the cache line of self ID and performs writing in the cache line of the self ID (step 1508). No writing is performed in the cache line of the preceding ID. However, if the cache line of status "D" having a succeeding thread identifier exists, similar data is also written in this cache line. If a plurality of cache lines coincident with the preceding ID exist, the data of the cache line holding ID which is closest to the self ID is supplied for copying between lines.

If no preceding ID hit is realized, the existence of one coincident with the succeeding ID is investigated (step 1506). If a cache line coincident with the succeeding ID exists and its status is status "C", writing is performed for the data of the cache line via the write buffer 47. Then, the succeeding ID is changed to self ID (step 1509).

If no cache lines coincident with the succeeding ID exist, the operation of a cache miss is performed (step 1502).

For example, assuming that a certain cache entry 44 is in a state like that shown in FIG. 16, in the processor 34 in which a thread identifier is "2", if a writing request is made for the data of the address "0×100", preceding ID hit is realized for the address tag 41 of the cache memory 35. In this case, the data of the way 0 is copied as self ID for the way 1 or the way 3 and writing is performed in the copied data array (i.e., way 1 or way 3). The thread identifier tag 39, the status bit 40 and the address tag 41 are set to "2", status "D" and "0×100" respectively.

When accessing is to be made to the address "0×200", because of self hit, data is written in the data array 42 via the write buffer 47. The status bit 40 of the cache entry 44 is set to status "D".

When accessing is to be made to the address "0×300", the data of the address "0×300" exists in the way 2. However, the thread identifier tag 39 is "3", a thread is a succeeding thread and a state is status "D" for the way 2, a cache miss is committed.

The data of the address "0×400" exists in the way 3 and the thread identifier tag 39 is "3". However, since a state is status "C", succeeding ID hit is realized. Accordingly, the data of the cache line 43 of the way 3 is written via the write buffer 47. Then, the succeeding ID is changed to self ID.

Figure 17:
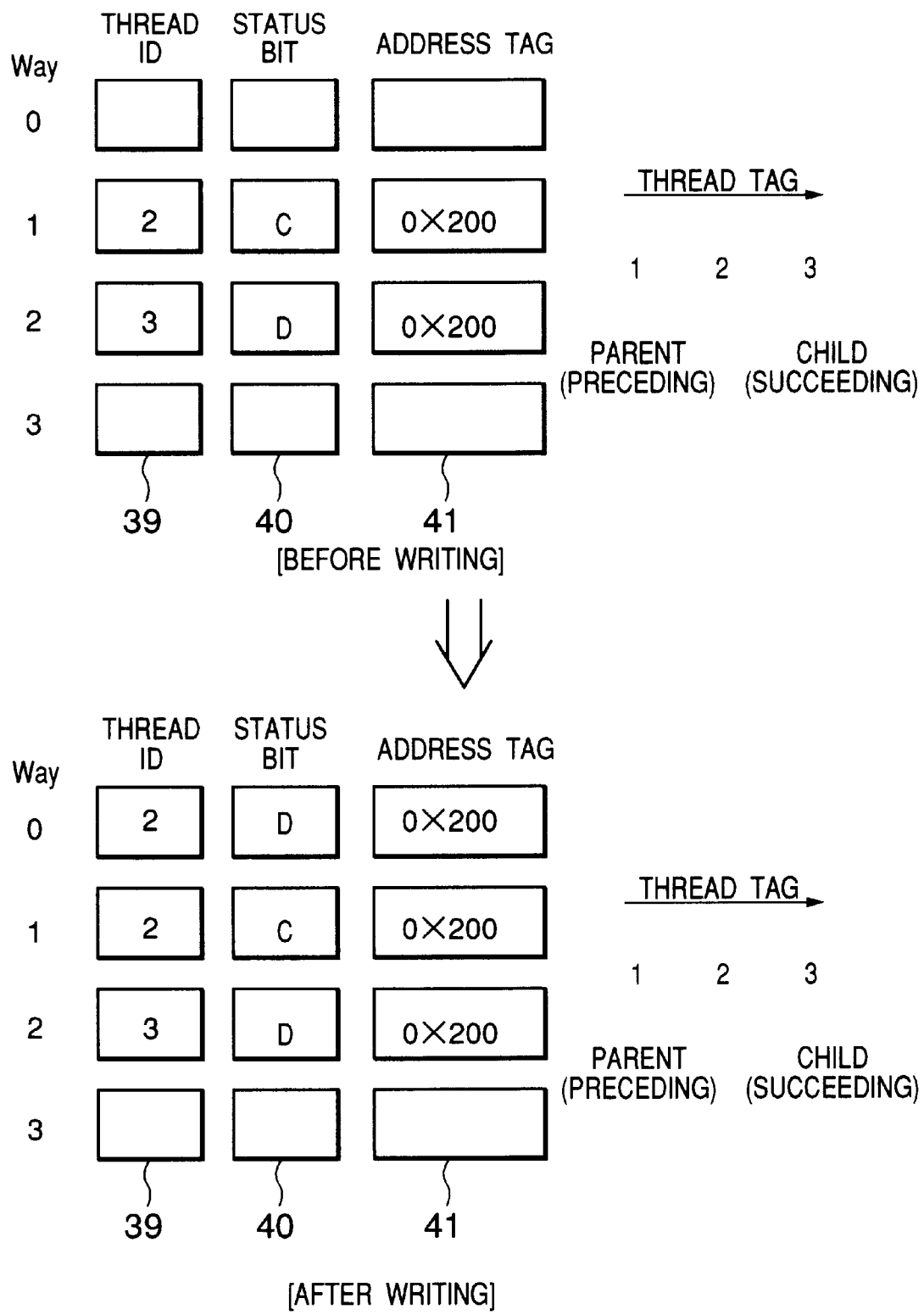
FIG. 17 is a view showing another status example of the cache entry of the third embodiment of the invention.

Assuming that the status of the cache entry is status "Before Write" like that shown in FIG. 17, after the processor 34 of a thread identifier "2" makes a writing request for the data whose address tag 41 is "0×200", preceding ID hit is realized and the data of the way 1 is copied to the way 0 or the way 3. Herein, it is assumed that the data is copied to the way 0.

Thus, for the way 0, the thread identifier tag 39, the address tag 41 and the status bit 40 are set to "2", "0×200" and status "D" respectively. The result of writing the content of the data array 42 of the way 1 for the data copied to the way 0 is written in the data array 42 of the way 0 via the write buffer 47.

At the same time, the same data is written in the data array 42 of the way 2 via the write buffer 47. By the above-described operations, the status of the cache entry becomes status "After Write" like that shown in FIG. 17. When the data of the cache line 43 is to be copied or new address data is to be fetched from the main memory 38, the data of the cache line 43 existing at this time must be replaced by another. In the conventional cache memory, a cache line 43 whose data must be replaced by another is decided at random or based on a past referencing history at this time.

On the other hand, in the cache memory of the embodiment, since for a preceding thread the process needs to refer to data before the correction of the data by a succeeding thread, the write-back operation of the data array 42 of status "D" in the main memory 38 must be prohibited unless a thread is a first preceding thread in the system. In order to prevent the occurrence of a deadlock caused by the impossibility of securing any cache lines 43 for the preceding thread, one cache line 43 must always be secured for a first preceding thread in one entry. Accordingly, if any cache lines 43 cannot be secured for a succeeding thread, the process must wait for the end of the execution of the preceding thread.

By using a model which does not define the data dependence of a succeeding thread on a preceding thread as a thread execution model, even if restrictions are imposed on the cache line 43 to be replaced by another, the occurrence of a deadlock can be prevented.

According to the third embodiment, by performing the above-described cache controlling, a time sequence relationship can be maintained among threads and data antidependence can be eliminated even if the cache memory shared by the processors 34 is used. However, if a preceding thread starts writing in an address identical to an address already written or read by a succeeding thread later on, the time sequence relationship among the threads cannot be maintained at it is. In this case, synchronism must be acquired among the threads by using software.

Next, the fourth embodiment of the present invention will be described.

According to the fourth embodiment, in addition to the elements provided in the first to third embodiment, hardware is provided to guarantee that even if a preceding thread performs writing in an address already written or read by a succeeding thread, the content of the writing cannot be reflected in the cache memory of the succeeding thread.

Figure 18:
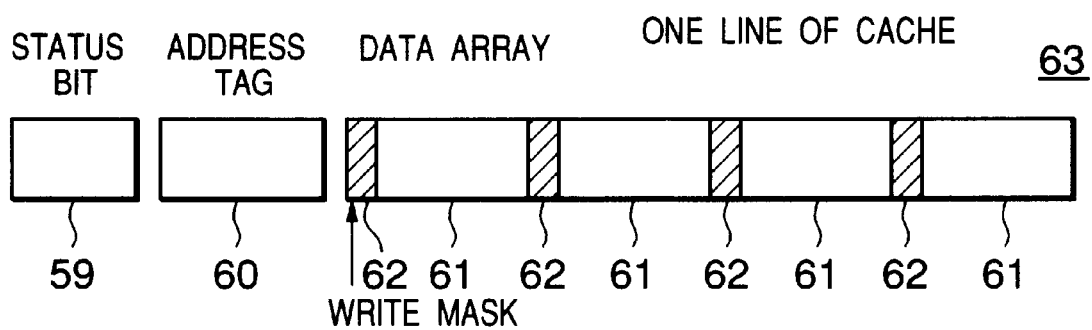
FIG. 18 is a block diagram showing a line configuration of a cache memory of a fourth embodiment of the present invention.

Referring to FIG. 18, the cache line of the cache memory of the fourth embodiment comprises a write mask 62 in addition to the configurational element of the first embodiment described above with reference to FIG. 4. This write mask 62 is provided for each word unit or a minimum writing unit of a data array 61. The write mask 62 is cleared when new data from a memory or data from another cache is stored in a cache line 63. If writing is performed by the thread of the cache line 63, the write mask 62 is set for each written word or a minimum writing unit.

As in the cases of the first to third embodiments, in the fourth embodiment, in order to maintain a sequential order among threads, writing by a preceding thread must be reflected in the data array 61 of a cache line 63 which belongs to the succeeding thread of an identical address tag 60. Accordingly, controlling is performed for this purpose.

In the first to third embodiments, however, no guarantee is given to ensure that the writing of a preceding thread performed for an address already written or read by a succeeding thread is not reflected in the cache memory of the succeeding thread side (i.e., writing sequence relationship among a plurality of threads). In order to maintain such a writing sequence relationship, synchronism must be acquired between the threads by using software as in the case of reading of the write data of the preceding thread by the succeeding thread.

Next, as examples of the operations of the fourth embodiment, operations when the data array 61 of the cache line 63 is in states like those shown in FIGS. 19 to 22 will be described.

Figure 19:
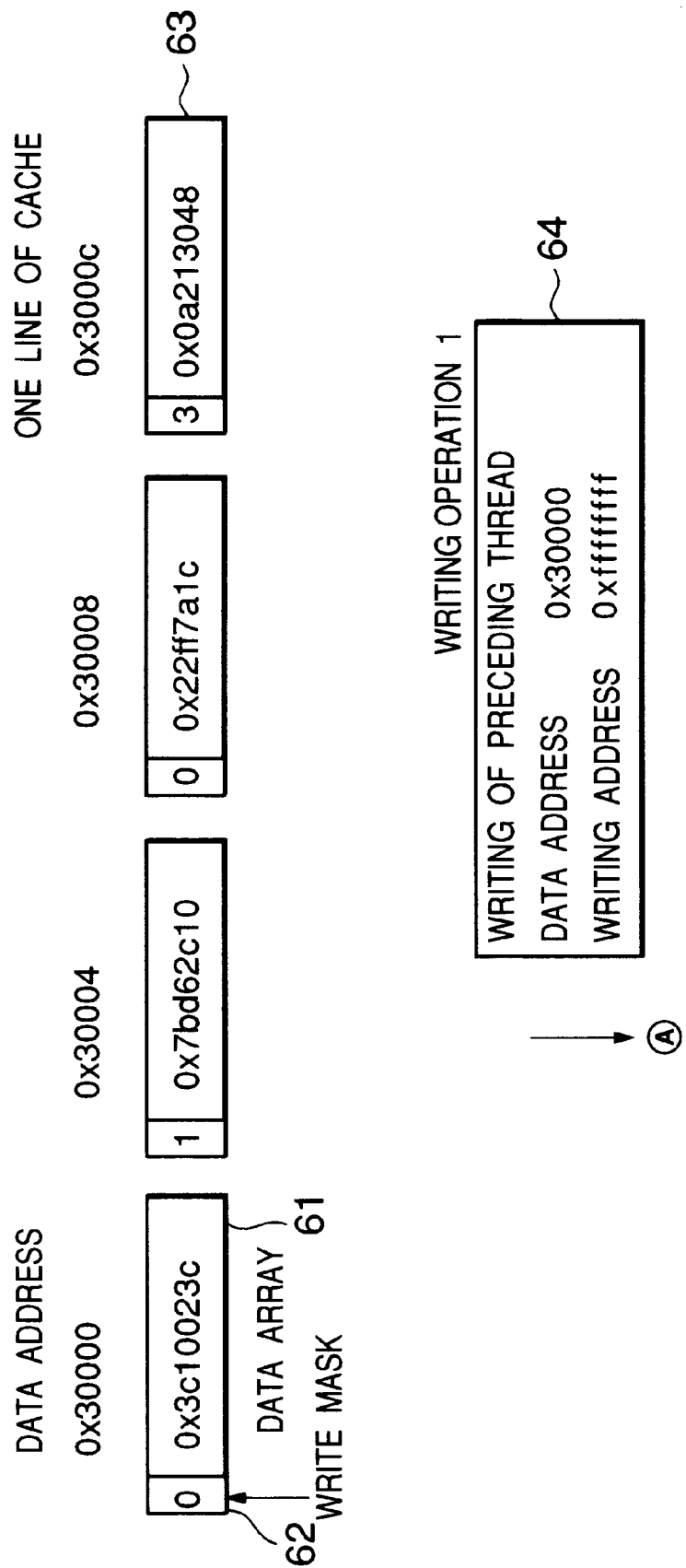
FIG. 19 is a view showing an operation example of the cache memory of the fourth embodiment of the invention.

Referring to FIG. 19, a writing operation 1 (64) is writing performed by the processor to which the cache line belongs. By this operation, "0xffffffff" is written in an address "0x3000".

Figure 20:
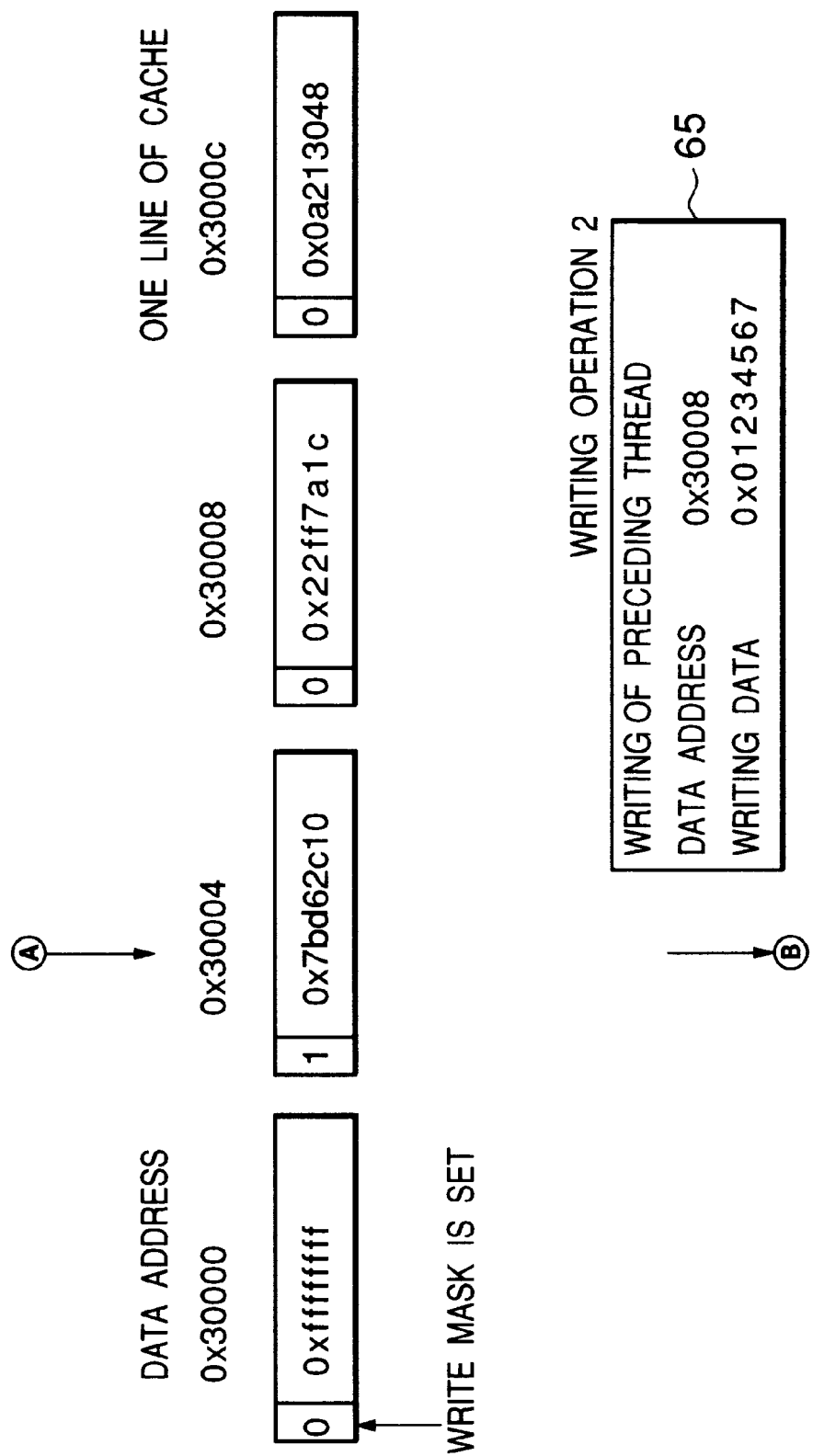
FIG. 20 is a view showing another operation example of the cache memory of the fourth embodiment of the invention.
Figure 21:
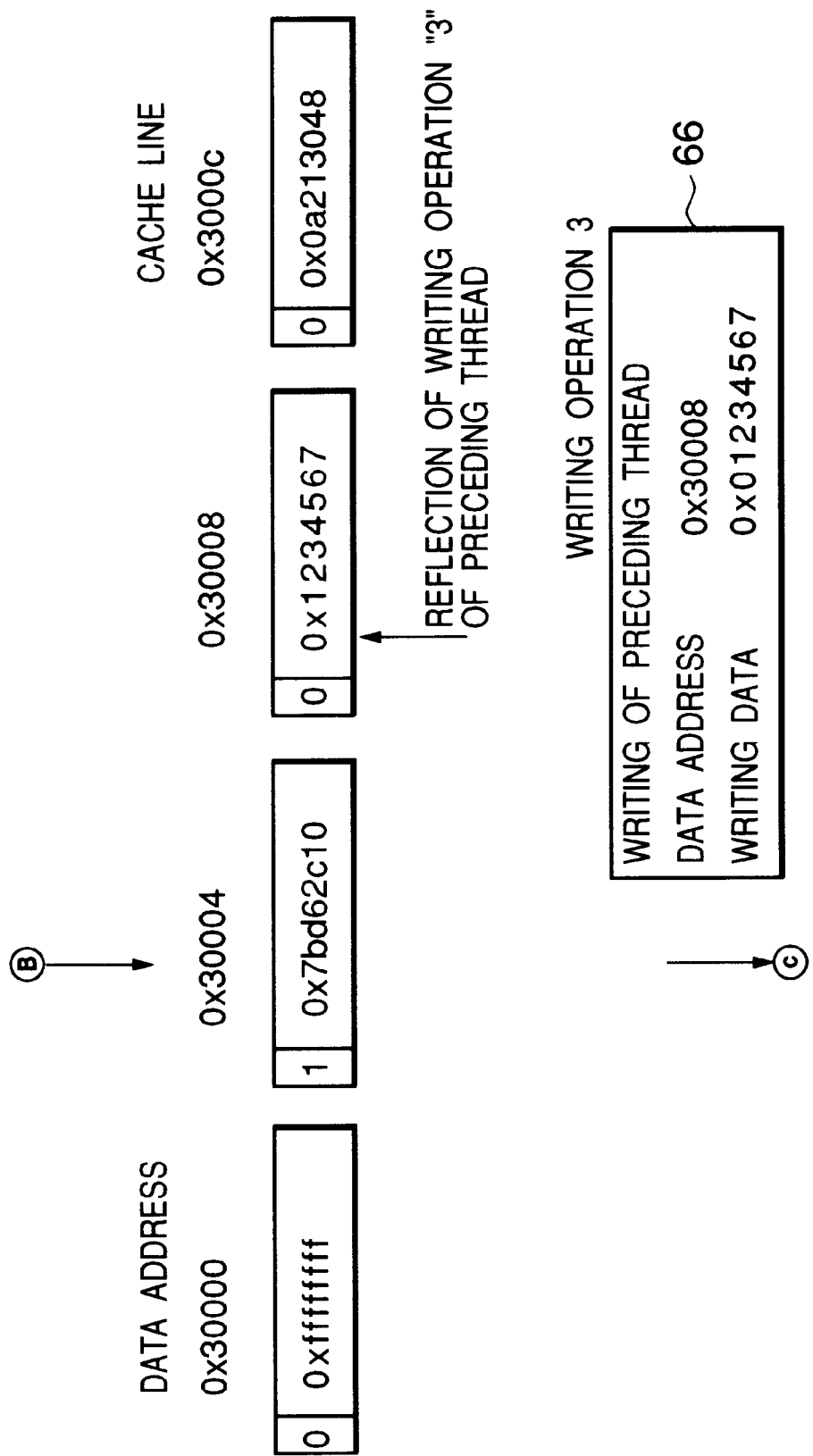
FIG. 21 is a view showing yet another operation example of the cache memory of the fourth embodiment of the invention.
Figure 22:
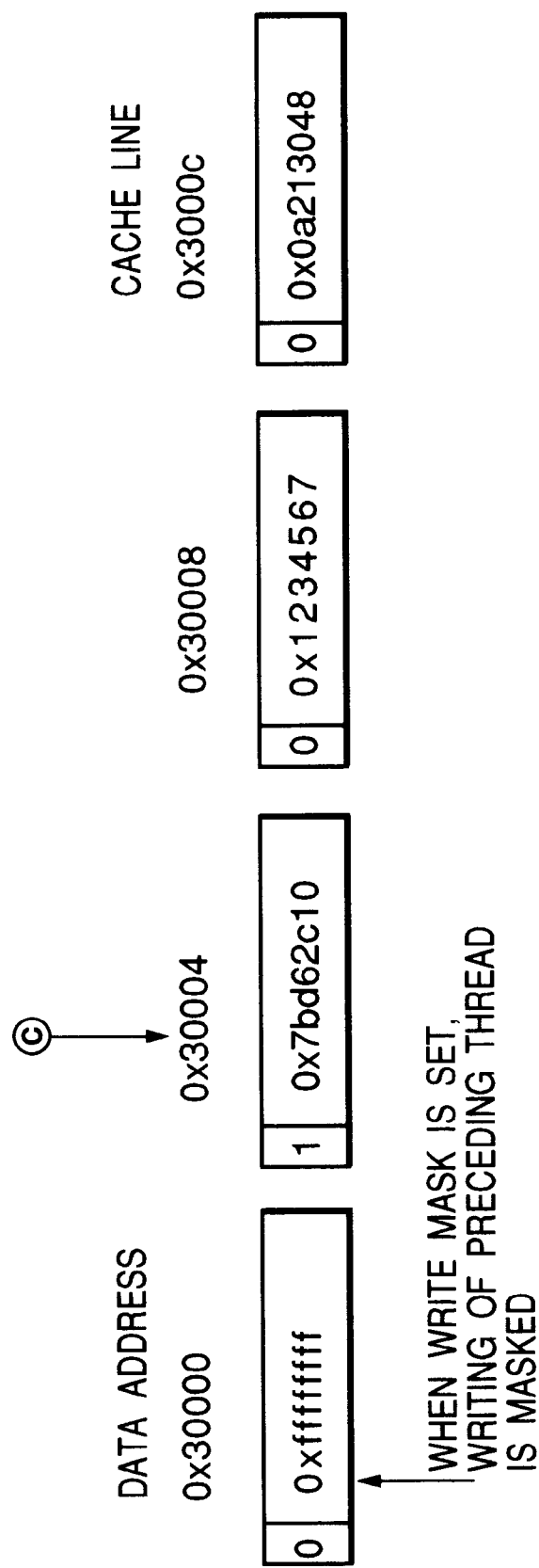
FIG. 22 is a view showing yet further operation example of the cache memory of the fourth embodiment of the invention.

After the above-noted operation, the data of "0xffffffff" is written in the "0x30000" address position of the data array 61 and simultaneously a corresponding write mask 62 is set (see FIG. 20).

Next, as a writing operation 2 (65), an operation performed so as to maintain a time sequence relationship when a preceding thread writes the data of "0x01234567" in an address "0x30008" will be described. In this case, since no write mask 62 corresponding to the address "0x30008" is set, the writing operation of the preceding thread is reflected and the data of "0x01234567" is written in the address "0x30008" position of the data array 61 (see FIG. 21).

Lastly, as a writing operation 3 (66), an operation performed so as to maintain a time sequence relationship when a preceding thread writes the data of "0x00000000" in the address "0x30000" will be described. In this case, since a write mask 62 corresponding to the address "0x30000" is set, the writing operation of the preceding thread is reflected but not in the address "0x30000" position of the data array 61 (see FIG. 22). Such a situation occurs, because according to the rule of a time sequence relationship among threads, the writing operation 1 (64) is prescribed as an event occurring later than the writing operation 3 (66).

According to the fourth embodiment, processing for preventing the reflection of writing from the preceding thread in the word or the minimum writing unit in which the write mask 62 has been set is performed by the cache memory of the succeeding thread side and thereby the time sequence relationship of writing in an identical address can be maintained among a plurality of threads by controlling of the cache memory.

Next, the fifth embodiment of the present invention will be described. In the fifth embodiment, there are a plurality of definitions for the operation mode of a multi-processor system and the mode can be changed from one definition to the other. The configuration of the cache of the fifth embodiment can be applied for all the cache memories of the first to fourth embodiments.

In the cache memory of each of the first to fourth embodiments, the cache coherency controller performs controlling for propagating writing only to the cache of a succeeding thread based on thread sequence information received from a thread management unit. However, in the fifth embodiment, by means of extension for switching such writing propagation control to be performed for all the cache memories holding identical addresses, a model for guaranteeing all sequential relations among threads and executing a plurality of threads is executed. In other words, by instructing in which mode the cache coherency controller of each embodiment should be operated beforehand, an operation mode is switched.

Now, the extension method of each embodiment will be described in detail.

First, the multi-processor system comprising the distributed type cache coherency controller of the first embodiment which is provided for each of the processors connected to one another via buses and configured by bus connection will be described.

In this case, a signal for non-specification of the sequence of threads is transmitted from the thread management unit 1 shown in FIG. 2 through the thread sequence information transmission bus 10 to the cache coherency controller 4. After receiving such information, the cache coherency controller 4 performs no controlling based on the determination of "a preceding thread or a succeeding thread". In other words, when a reading miss occurs, no determination is made as to "whether a thread is a preceding thread or not" like that shown in the flowchart of FIG. 5 (step 506 of FIG. 5) and data is always supplied from the cache of "D"/"DSM" status.

Also, when writing by another thread occurs, no determination is made as to "whether a thread is preceding or succeeding" like that shown in the flowchart of FIG. 6 and writing by another thread is reflected in the cache of a self thread. Switching of these modes is performed only by switching each decision logic of the cache coherency controller 4 between valid and invalid. Accordingly, the extension of hardware can be limited to a minimum size.

Next, extension for the second embodiment will be described. In the second embodiment (see FIG. 7), only one cache coherency controller 26 exists in the system, which is shared by the configuring elements of the system. As in the case of the bus connection method, if no time sequence relationship exists among threads, a signal for non-specification of the sequence of the threads is transmitted from the thread management unit 19 through the thread sequence information transmission bus 25 to the cache coherency controller 26. In this case, no determination is made as to whether "a thread is preceding or succeeding" like that shown in the flowchart of FIGS. 9 and 10. If the cache memory 21 of status "D" exists when reading is to be performed, a request is made for data transfer from the cache memory 21. For writing, write data is transmitted to a shared line. As in the case of bus connection, switching of these modes is performed only by switching each decision logic of the cache coherency controller 4 between valid and invalid. Accordingly, the extension of hardware can be limited to a minimum size.

In the third embodiment, when parallel processing is to be performed by a thread model having no time sequence relationship, caches are all treated as being shared. In other words, the processing step of comparing the value of the thread identifier tag 39 with another for the cache entry 44 shown in FIG. 13 is removed from the flowchart of FIGS. 14 and 15. That is, only by means of comparison between the requested address and the address arbiter 41, a cache hit or a miss-hit is determined.

Therefore, in the fifth embodiment, it is only necessary to switch each decision logic of the cache coherency controller 36 between valid and invalid and thus the extension of hardware can be limited to a minimum size. In addition, in such an operation, there is no possibility that a plurality of cache lines hold data of identical addresses.

Next, the sixth embodiment of the present invention will be described.

In the sixth embodiment, the operations of the fifth embodiment are switched between each other based on a requested address. Changing of cache algorithm based on a reference address is performed by giving an attribute to each entry of a TBL (Translation Lookaside Buffer). Such a switching technology has been available in the prior art. The sixth embodiment can be realized by combining such a technology with the fifth embodiment.

As apparent from the foregoing, the present invention is effective in that by extending the cache coherency maintenance function of a cache memory widely used for a microprocessor, in a thread execution model for simultaneously executing a plurality of threads having a consecutive time sequence relationship (sequential order) in the same memory space, data anti-dependence on the memory can be hidden from software and thus more efficient parallel processing can be performed.

In order to obtain the same effect by extending the conventional system, exclusively used hardware is needed and hardware costs are increased. According to the present invention, however, this problem is solved by using the cache memory.

The present invention is also effective in that the necessity of comparing all the bits indicating addresses with one another can be eliminated by using the cache memory. Moreover, according to the present invention, coexistence with a thread execution mode having no time sequence relationship can be facilitated. For data dependence, the present invention makes no mention of solving a problem by hardware. However, data pro-dependence is a problem intrinsic to parallel processing, which is to be solved by a synchronizing mechanism. Accordingly, a hardware configuration can be simplified.

While the invention has been described in terms of several preferred embodiments, those skilled in the art will recognize that the invention can be practiced with modification within the spirit and scope of the appended claims.

What is claimed is:

1. A cache coherency controller in a multi-processor system, said multi-processor system comprising:

a plurality of processors;

a cache memory for each of said plurality of processors;

a thread sequence information table for holding orders of threads executed by said multi-processor system;

a comparator for determining a sequential relationship among threads based on said thread sequence information table; and a cache coherency maintenance protocol sequencer for maintaining coherency by supply first cache line including data produced by a preceding thread to a second cache line including data produced by a succeeding thread following said preceding thread based on a result of determination performed by said comparator and preventing said second cache line including data produced by said succeeding thread from being supplied to said first cache line including data produced by said preceding thread, said cache coherency maintenance protocol sequencer, when a read miss occurs in corresponding cache memory, loads data modified by a preceding thread in a corresponding cache memory if said data is included in another cache memory, and said cache coherency maintenance protocol sequencer, when a writing operation occurs in a cache memory other than in corresponding cache memory, loads write data in said corresponding cache memory if said writing operation occurred by a preceding thread.

2. A cache coherency controller in a multi-processor system, said multi-processor system comprising:

a plurality of processors;

thread management unit for allocating thread identifiers in generation order of threads executed on s aid plurality of processors, said thread management unit including a thread sequence information table holding orders of threads executed by said multi-processor system;

a comparator for determining a sequential relationship among threads based on said thread sequence information table;

a cache memory provided corresponding to each of said plurality of processors, said cache coherency controller for controlling cache coherency maintenance of said cache memory;

a main memory connected to said cache coherency controller and divided into a plurality of memory lines; and a cache coherency maintenance protocol sequencer for maintaining coherency by supplying a first cache line including data produced by a preceding thread to a second cache line including data produced by a succeeding thread following said preceding thread based on a result of determination performed by said comparator and preventing said second cache line including data produced by said succeeding thread from being supplied to said first cache line including data produced by said preceding thread, said cache coherency maintenance protocol sequencer including a directory table for holding status of each of said cache memories corresponding to said memory lines of said main memory.

3. The cache coherency controller according to claim 2, wherein:

said cache coherency maintenance protocol sequencer, when a read miss occurs in corresponding cache memory, loads data modified by a preceding thread in a corresponding cache memory if said data is included in another cache memory; and said cache coherency maintenance protocol sequencer, when a writing operation occurs in a cache memory other than in corresponding cache memory, loads write data in said corresponding cache memory if said writing operation occurred by a preceding thread.

4. The cache coherency controller according to claim 3, said directory table comprising:

a valid bit for indicating existence of a memory line copy in said corresponding cache memory; and a dirty bit for indicating existence of a modified memory line copy in said corresponding cache memory.

5. A cache coherency controller in a multi-processor system, said multi-processor system comprising:

a plurality of processors;

a thread management unit for allocating thread identifiers in generation order of threads executed on said plurality of processors, said thread management unit including a thread sequence information table for holding orders of threads executed by said multi-processor system;

a comparator for determining a sequential relationship among threads based on said thread sequence information table;

a cache memory shared by said plurality of processors, said cache coherency controller for controlling cache coherency maintenance of said cache memory;

a main memory connected to said cache memory; and a cache coherency maintenance protocol sequencer for maintaining coherency by supplying a first cache line including data produced by a preceding thread to a second cache line including data produced by a succeeding thread following said preceding thread based on a result of determination performed by said comparator and preventing said second cache line including data produced by said succeeding thread from being supplied to said first cache line including data produced by said preceding thread.

6. The cache coherency controller according to claim 5, wherein said cache memory holds a thread identifier and a status bit for each cache line and allocates a cache line for each thread.

7. A cache coherency controller in a multi-processor system having a plurality of processors, comprising:

a thread sequence information table for holding orders of threads executed by said multi-processor system;

a comparator for determining a sequential relationship among threads based on said thread sequence information table; and a cache coherency maintenance protocol sequencer for maintaining coherency by supplying a first cache line including data produced by a preceding thread to a second cache line including data produced by a succeeding thread following said preceding thread based on a result of determination performed by said comparator and preventing said second cache line including data produced by said succeeding thread from being supplied to said first cache line including data produced by said preceding thread;

wherein a cache line comprises a write mask, said write mask is set when writing is performed by a thread to which a cache line belongs, and writing in a cache line is prohibited if said write mask is set when said writing is performed in said cache line of a succeeding thread by a preceding thread.

8. A cache coherency controller in a multi-processor system having a plurality of processors, comprising:

a thread sequence information table for holding orders of threads executed by said multi-processor system;

a comparator for determining a sequential relationship among threads based on said thread sequence information table; and a cache coherency maintenance protocol sequencer for maintaining coherency by supplying a first cache line including data produced by a preceding thread to a second cache line including data produced by a succeeding thread following said preceding thread based on a result of determination performed by said comparator and preventing said second cache line including data produced by said succeeding thread from being supplied to said first cache line including data produced by said preceding thread, said cache coherency maintenance protocol sequencer further comprising a mode for propagating writing to all cache memories holding identical addresses.

* * * * *